United States Patent
Imai et al.

(10) Patent No.: US 10,472,498 B2
(45) Date of Patent: *Nov. 12, 2019

(54) MOLDED ARTICLE AND MOLDING MATERIAL

(71) Applicant: Toray Industries, Inc., Tokyo (JP)

(72) Inventors: Naokichi Imai, Iyo-gun (JP); Kentaro Sano, Iyo-gun (JP); Keisuke Inose, Iyo-gun (JP)

(73) Assignee: Toray Industries, Inc., Tokyo (JP)

(*) Notice: Subject to any disclaimer, the term of this patent is extended or adjusted under 35 U.S.C. 154(b) by 117 days.

This patent is subject to a terminal disclaimer.

(21) Appl. No.: 15/873,031

(22) Filed: Jan. 17, 2018

(65) Prior Publication Data

US 2018/0142083 A1    May 24, 2018

Related U.S. Application Data

(62) Division of application No. 15/030,641, filed as application No. PCT/JP2014/078288 on Oct. 24, 2014, now Pat. No. 9,902,840.

(30) Foreign Application Priority Data

Oct. 29, 2013  (JP) .................................. 2013-224130

(51) Int. Cl.
  *C08K 9/04*    (2006.01)
  *C08K 7/06*    (2006.01)
  *C08L 81/00*   (2006.01)
  *B29C 70/14*   (2006.01)
  *B29C 45/00*   (2006.01)

(52) U.S. Cl.
  CPC ............ *C08K 9/04* (2013.01); *B29C 45/0001* (2013.01); *B29C 70/14* (2013.01); *C08K 7/06* (2013.01); *C08L 81/00* (2013.01); *C08K 2201/004* (2013.01)

(58) Field of Classification Search
  CPC .................................. C08L 81/04; C08K 7/06
  See application file for complete search history.

(56) References Cited

U.S. PATENT DOCUMENTS

| | | | |
|---|---|---|---|
| 5,679,456 A | 10/1997 | Sakai et al. | |
| 6,042,910 A | 3/2000 | Kinouchi et al. | |
| 7,824,770 B2 | 11/2010 | Honma et al. | |
| 2009/0234068 A1 | 9/2009 | Horiuchi et al. | |

FOREIGN PATENT DOCUMENTS

| | | |
|---|---|---|
| JP | 08-059303 A | 3/1996 |
| JP | 08-325385 A | 12/1996 |
| JP | 11-021457 A | 1/1999 |
| JP | 2005-313607 A | 11/2005 |
| JP | 2012-057277 A | 3/2012 |
| JP | 2013-006960 A | 1/2013 |
| JP | 2013-117000 A | 6/2013 |
| JP | 2013-117001 A | 6/2013 |
| JP | 2013-117003 A | 6/2013 |
| JP | 2013-177560 A | 9/2013 |

OTHER PUBLICATIONS

Lawrence T. Drzal, "The effect of polymeric matrix mechanical properties on the fiber-matrix interfacial shear strength," Materials Science and Engineering: A, vol. 126, Issues 1-2, 1990, pp. 289-293 (Abstract).

*Primary Examiner* — Wenwen Cai
(74) *Attorney, Agent, or Firm* — DLA Piper LLP (US)

(57) ABSTRACT

A molded article includes 10 to 40% by mass of reinforcing fibers (A); and 60 to 90% by mass of a matrix resin (B) mainly including a polyarylene sulfide, the molded article satisfying conditions (I) to (IV) and having a tensile strength of 240 MPa or more in a main orientation direction of the reinforcing fibers (A) in the molded article:

(I) strand tensile strength of the reinforcing fibers (A) is 1.5 to 5.5 OPa;
(II) number average fiber length of the reinforcing fibers (A) in the molded article is 0.4 mm or more and less than 0.6 mm;
(III) tensile elongation of the matrix resin (B) is 1.5 to 10%; and
(IV) interfacial shear strength between the reinforcing fibers (A) and the matrix resin (B) is 20 MPa or more.

10 Claims, 3 Drawing Sheets

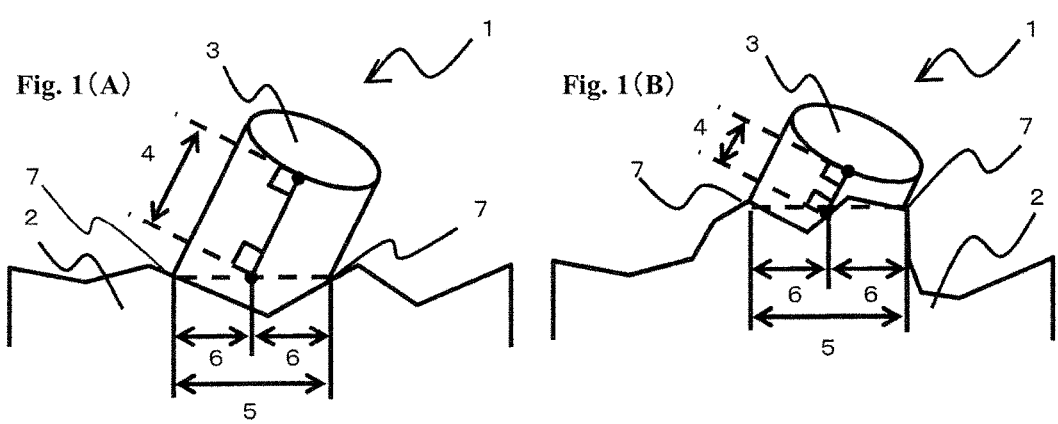

MOLDED ARTICLE AND MOLDING MATERIAL

TECHNICAL FIELD

This disclosure relates to a molded article including a polyarylene sulfide and reinforcing fibers and, more specifically, to a molded article including a polyarylene sulfide having high dynamic characteristics, particularly a high tensile elongation, and reinforcing fibers and which is suitably produced by injection molding, and a molding material to produce the molded article.

BACKGROUND

Molded articles produced using a fiber-reinforced resin composition including a thermoplastic resin and reinforcing fibers are easily molded and processed by virtue of the characteristics of the thermoplastic resin, do not require a load in storage unlike thermosetting resins, and are excellent in recyclability. As these molded articles, those in a variety of forms are known such as thermoplastic prepregs in which reinforcing fibers are arranged in the form of a sheet, and pellets in which reinforcing fibers are randomly dispersed. Molded articles including reinforcing fibers and a thermoplastic resin are excellent in balance between lightness and dynamic characteristics, and are therefore widely used as structural members of aircraft, automobiles, watercraft and the like, electronic equipment housings, sporting goods, and industrial materials such as building materials.

Among thermoplastic resins, a polyarylene sulfide is particularly excellent in heat resistance and chemical resistance so that a molded article produced using the resin can be expected to be applied as an alternative to a metal material. However, when a molded article produced using a polyarylene sulfide is used as an alternative to a metal material, further improvement in the dynamic characteristics, particularly the tensile strength, of the molded article is desired. This is because since the tensile elongation of a general polyarylene sulfide is lower than the tensile elongation of reinforcing fibers, and interfacial bondability between the polyarylene sulfide and reinforcing fibers is low, the reinforcing effect of reinforcing fibers cannot be sufficiently utilized in the molded article.

General means to improve the tensile strength and elongation of a molded article is enhancement of the elongation of a polyarylene sulfide. However, the tensile elongation of a polyarylene sulfide correlates to its molecular weight and, hence, its melt viscosity and, when the tensile elongation of the polyarylene sulfide is improved, the melt viscosity increases so that moldability in production of a molded article may be considerably impaired. It is well known that it becomes harder to combine a polyarylene sulfide with reinforcing fibers as the melt viscosity of the polyarylene sulfide increases. In that case, it is necessary to make the process temperature higher and therefore a polyarylene sulfide is not suitable for easily producing a molded article and a molding material with high productivity. For these reasons, it is an important technical challenge to secure both the tensile strength and molding processability in a molded article produced using a polyarylene sulfide.

In view of the above-mentioned situations, techniques have been disclosed in which the bending characteristic of a molded article is improved by a molding material obtained by sizing to carbon fibers a compound mainly including an epoxy resin and containing a specific catalyst in a molding material including a polyarylene sulfide and carbon fibers as an attempt to improve dynamic characteristics. In those techniques, attempts are made using various forms of reinforcing fibers (Japanese Patent Laid-open Publication Nos. 2013-117003, 2013-117001 and 2013-117000). However, in those techniques, a certain improvement in dynamic characteristics is achieved, but for dynamic characteristics, only the bending characteristic is considered and, in addition, it is not considered that the elongation of a polyarylene sulfide and the state of dispersion of reinforcing fibers in a molded article considerably influence tensile characteristics useful as design parameters for a product. It is predicted that further improvement of the strength is required in application development which will increasingly progress in future.

As a technique with attention given to electrical characteristics and dynamic characteristics among the characteristics of a molded article, an injection-molded article including a polyphenylene sulfide and carbon fibers has been disclosed (Japanese Patent Laid-open Publication No. 8-325385). In the technique disclosed in JP '385, attention is given to the length of fibers in the molded article and the strand strength of carbon fibers, but the resin characteristics of the polyphenylene sulfide that serves as a matrix resin are not considered, and it is absolutely necessary that the dynamic characteristics (bending characteristic) be improved in terms of strength in the application development in future.

Japanese Patent Laid-open Publication No. 11-21457 describes an example of modification of a polyarylene sulfide. The purpose is to improve the adhesiveness of the resulting composite material itself, and the resin properties and processability of a polyphenylene sulfide that serves as a matrix resin are not considered. Further, the composite material shown in examples has a tensile strength of only 129 to 158 MPa, which is insufficient to use the composite material as an alternative to a metal material.

Japanese Patent Laid-open Publication No. 8-59303 discloses a composite material including reinforcing fibers treated with a surface modifier, and a thermoplastic resin, and the tensile characteristics thereof. However, the resin characteristics and processability of a polyphenylene sulfide as a matrix resin are not considered, and the tensile strength of the resulting composite material is insufficient for using the composite material as an alternative to a metal material.

It could therefore be helpful to provide a molded article having a sufficiently high tensile strength with high productivity by specializing the state of reinforcing fibers in the molded article and the characteristics of a polyarylene sulfide as a matrix resin.

SUMMARY

We thus provide a molded article including: 10 to 40% by mass of reinforcing fibers (A); and 60 to 90% by mass of a matrix resin (B) mainly including a polyarylene sulfide, the molded article satisfying the following conditions (I) to (IV) and having a tensile strength of 240 MPa or more in a main orientation direction of the reinforcing fibers (A) in the molded article:

(I) the strand tensile strength of the reinforcing fibers (A) is 1.5 to 5.5 GPa;
(II) the number average fiber length of the reinforcing fibers (A) in the molded article is 0.4 to 10 mm;
(III) the tensile elongation of the matrix resin (B) is 1.5 to 10%; and
(IV) the interfacial shear strength between the reinforcing fibers (A) and the matrix resin (B) is 20 MPa or more.

The molded article has a dramatically improved tensile strength as a result of controlling the form of fibers in the molded article, elongation of a polyarylene sulfide as a matrix resin, and interfacial bondability. Further, the molding material includes a specific polyarylene sulfide, and is thus excellent in productivity so that a molded article excellent in tensile strength can be easily produced.

We also provide a molded article including 10 to 40% by mass of reinforcing fibers (A); and 60 to 90% by mass of a matrix resin (B) mainly including a polyarylene sulfide, the molded article satisfying conditions (I) to (IV) and having a tensile strength of 240 MPa or more in a main orientation direction of the reinforcing fibers (A) in the molded article: (I) strand tensile strength of the reinforcing fibers (A) is 1.5 to 5.5 OPa; (II) number average fiber length of the reinforcing fibers (A) in the molded article is 0.4 mm or more and less than 0.6 mm; (III) tensile elongation of the matrix resin (B) is 1.5 to 10%; and (IV) interfacial shear strength between the reinforcing fibers (A) and the matrix resin (B) is 20 MPa or more.

We further provide a molded article including 10 to 40% by mass of reinforcing fibers (A); and 60 to 90% by mass of a matrix resin (B) mainly including a polyarylene sulfide, wherein the reinforcing fibers (A) are carbon fibers surface-treated with a compound having, in one molecule, three or more functional groups of at least one type selected from the group consisting of a carboxyl group, an amino group, a hydroxyl group and an epoxy group; the molded article satisfying conditions (I) to (IV) and having a tensile strength of 240 MPa or more in a main orientation direction of the reinforcing fibers (A) in the molded article: (I) strand tensile strength of the reinforcing fibers (A) is 1.5 to 5.5 OPa; (II) number average fiber length of the reinforcing fibers (A) in the molded article is 0.4 to 10 mm; (III) tensile elongation of the matrix resin (B) is 1.5 to 10%; and (IV) interfacial shear strength between the reinforcing fibers (A) and the matrix resin (B) is 20 Ma or more.

We also further provide a molded article including 10 to 40% by mass of reinforcing fibers (A); and 60 to 90% by mass of a matrix resin (B) mainly including a polyarylene sulfide, wherein mass average molecular weight of the polyarylene sulfide as main component of the matrix resin (B) is 10,000 to 40,000; the molded article satisfying conditions (I) to (IV) and having a tensile strength of 240 MPa or more in a main orientation direction of the reinforcing fibers (A) in the molded article: (I) strand tensile strength of the reinforcing fibers (A) is 1.5 to 5.5 OPa; (II) number average fiber length of the reinforcing fibers (A) in the molded article is 0.4 to 10 mm; (III) tensile elongation of the matrix resin (B) is 1.5 to 10%; and (IV) interfacial shear strength between the reinforcing fibers (A) and the matrix resin (B) is 20 MPa or more.

BRIEF DESCRIPTION OF THE DRAWINGS

FIGS. 1(A) and 1(B) are schematic views showing one example of a reinforcing fiber monofilament observed from a breakage cross-section after a tension test of a molded article.

DESCRIPTION OF REFERENCE SIGNS

Figure 2A:
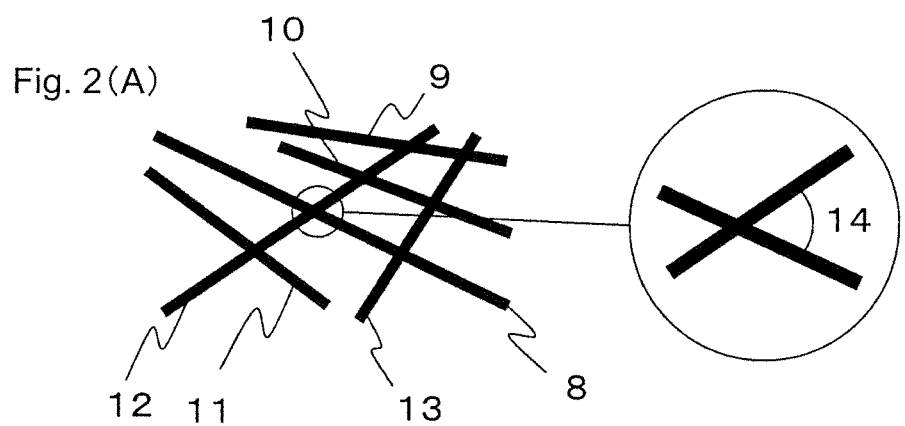
FIGS. 2(A) and 2(B) are schematic views showing one example of a dispersion state of reinforcing fibers in observation of the molded article.

1 Breakage surface after tension test of molded article including reinforcing fiber (A) and matrix resin (B)

2 Matrix resin (B)
3 Reinforcing fiber (A) monofilament
4 Fiber length
5 Length (width) between intersections of matrix resin (B) and reinforcing fiber (A) monofilaments
6 Length (width) equal to ½ of length (width) between intersections of matrix resin (B) and reinforcing fiber (A) monofilaments
7 Intersection of matrix resin (B) and reinforcing fiber (A) monofilament
8 Reinforcing fiber monofilament (s) as reference
9,10,11 Reinforcing fiber monofilament (t) that does not intersect reinforcing fiber monofilament (s)
12,13 Reinforcing fiber monofilament (t) that intersects reinforcing fiber monofilament (s)
14 Two-dimensional intersection angle

DETAILED DESCRIPTION

Our molded articles include: 10 to 40% by mass of reinforcing fibers (A); and 60 to 90% by mass of a matrix resin (B) mainly including a polyarylene sulfide, the molded articles satisfying conditions (I) to (IV) as described below, and having a tensile strength of 240 MPa or more in a main orientation direction of the reinforcing fibers in the molded articles.

The molded article includes 10 to 40% by mass of reinforcing fibers (A), and 60 to 90% by mass of a matrix resin (B) mainly including a polyarylene sulfide from the viewpoint of improvement of the tensile strength and molding processability in production of a molded article from a molding material. When the mass ratio of the reinforcing fibers (A) is less than 10% by mass (the mass ratio of the matrix resin (B) is more than 90% by mass), moldability in production of a molded article is improved, but the molded article has a poor tensile strength. When the mass ratio of the reinforcing fibers (A) is more than 40% by mass (the mass ratio of the matrix resin (B) is less than 60% by mass), the molding material has considerably poor moldability into a molded article and, in addition, the molded article is poor in balance between the tensile strength and the lightness and economy because the molded article includes the reinforcing fiber (A) more than necessary.

Further, the molded article is preferably a molded article including 20 to 40% by mass of the reinforcing fibers (A) and 60 to 80% by mass of the matrix resin (B). When the ratio of the reinforcing fibers (A) and the matrix resin (B) is in the above-mentioned range, a molded article further excellent in tensile strength is obtained while moldability in production of the molded article is maintained.

Further, the molded article has a tensile strength of 240 MPa in a main orientation direction of the reinforcing fibers (A) in the molded article. The tensile strength in the main orientation direction of the reinforcing fibers (A) in the molded article is a 0° direction tensile strength where the main orientation direction of the reinforcing fibers (A) in the molded article is defined as 0°. When the tensile strength is 240 MPa or more, beneficial features are obtained such that the width of design when the molded article is made into a product is broadened so that the molded article can be applied to a variety of products, and the thickness can be reduced in product design. When the tensile strength is less than 240 MPa, applications in which the molded article can be applied are increasingly restricted so that the width of product design is limited. For the same reason, the tensile strength is further preferably 280 MPa or more, especially preferably 300 MPa or more. Particularly, in an injection-molded article, it is more difficult to increase the length of the reinforcing fibers (A) so that it is more difficult to increase the strength as compared to a molded article produced using a sheet-shaped molding material (e.g., press-molded article). When a molded article having a high tensile strength as described above is obtained in injection molding capable of forming a complicated shape in a short time, the width of design can be dramatically broadened.

For the tensile strength in the molded article, the tensile strength in a direction orthogonal to the main orientation direction of reinforcing fibers in the molded article is preferably 150 MPa or more from the viewpoint of uniformity of characteristics in a direction. The tensile strength in a direction orthogonal to the main orientation direction of reinforcing fibers in the molded article is a 90° direction tensile strength where the main orientation direction of the reinforcing fibers (A) in the molded article is defined as 0°. The tensile strength in a direction orthogonal to the main orientation direction is more preferably 200 MPa or more because the width of strength design in the molded article is broadened as the tensile strength in this direction becomes higher.

The main orientation direction of reinforcing fibers in the molded article refers to an arrangement direction of reinforcing fibers observed from the surface of the molded article. As a measurement method, reinforcing fibers on the surface of the molded article are observed with a microscope to determine the main orientation direction. For reinforcing fiber monofilaments observed on the surface of the molded article, any reference direction is defined as D, and an angle α formed by the direction D and the reinforcing fiber monofilament is measured for each of 400 reinforcing fiber monofilaments. Then, the sum of angles α for the 400 measured monofilaments is divided by 400, i.e., the number of the measured monofilaments, to identify a direction along the most intense orientation, and this direction is determined as a main orientation direction of reinforcing fibers in the molded article, and especially defined as 0°. A direction orthogonal to the direction 0° determined in this measurement is defined as 90°.

Condition (I) is that the strand tensile strength of the reinforcing fibers (A) is 1.5 to 5.5 GPa. When the strand tensile strength of the reinforcing fibers (A) is 1.5 to 5.5 GPa, the tensile characteristics of the molded article can be efficiently improved because the reinforcing fibers (A) as a main factor of strength development in the molded article are strong. It is preferable for strength development in the molded article that the strand tensile strength is high, but reinforcing fibers having a high strand tensile strength tend to be expensive in terms of cost, and the strand tensile strength is more preferably 3 to 5.5 GPa, especially preferably 4 to 5 GPa from the viewpoint of balance between economy and tensile strength development in the molded article.

The strand tensile strength of the reinforcing fibers (A) can be determined in accordance with the following procedure in conformity with the resin impregnation strand test method in JIS R7608 (2007). As a resin formulation, "CELLOXIDE (registered trademark)" 2021P (manufactured by Daicel Chemical Industries, Ltd.)/boron trifluoride monoethylamine (manufactured by Tokyo Chemical Industry Co., Ltd.)/acetone=100/3/4 (parts by mass) is used, and as curing conditions, curing is performed at normal pressure at 130° C. for 30 minutes. A measurement is made for each of ten strands in a reinforcing fiber bundle, and the average thereof is defined as a strand tensile strength.

Examples of the reinforcing fibers (A) that form a molded article include metal fibers formed of a metal such as aluminum, brass or stainless steel; polyacrylonitrile (PAN)-based, rayon-based, lignin-based and pitch-based carbon fibers and graphite fibers; insulating fibers such as glass fibers; and inorganic fibers such as silicon carbide fibers and silicon nitride fibers. These fibers may be subjected to a surface treatment. Examples of the surface treatment include a treatment with a coupling agent, a treatment with a sizing agent, a treatment with a binder and an additive deposition treatment in addition to a metal coating treatment as a conductor.

Particularly, the reinforcing fibers (A) are preferably carbon fibers surface-treated with a compound having, in one molecule, three or more functional groups of at least one type selected from the group consisting of a carboxyl group, an amino group, a hydroxyl group and an epoxy group as described later. When as a compound to be used for the surface treatment (hereinafter, referred to simply as a surface treatment agent), only a compound in which the number of the functional groups in one molecule is less than 3 is used, reaction points between the compound and the reinforcing fibers (A) or the matrix resin (B) are insufficient so that the effect of improving the dynamic characteristics such as the tensile strength and the elongation, of the resulting molded article may not be obtained.

Preferably, the surface treatment agent exists at the interface between the reinforcing fibers (A) and the matrix resin (B). Accordingly, the surface treatment agent is applied to the surfaces of reinforcing fiber (A) monofilaments. By adding the surface treatment agent to the reinforcing fibers (A) beforehand, the surfaces of the reinforcing fibers (A) can be effectively modified even with a small deposition amount.

The surface treatment agent having the specific structure is contained in an amount of preferably 0.01 to 5 parts by mass, further preferably 0.1 to 2 parts by mass based on 100 parts by mass of the reinforcing fibers (A). When the content of the surface treatment agent is less than 0.01 part by mass, it may be unable to sufficiently cover the surfaces of the reinforcing fibers (A) with the surface treatment agent having the specific structure so that the effect of improving the dynamic characteristics such as the tensile strength and the elongation, of the resulting molded article is hard to be exhibited. When the content of the surface treatment agent is more than 5 parts by mass, the thickness of a film formed on the surfaces of the reinforcing fibers (A) by the surface treatment agent excessively increases so that it may be difficult to disperse the reinforcing fibers (A) in the form of monofilaments in the resulting molded article, or the dynamic characteristics such as the tensile strength and the elongation may be deteriorated. The preferred range of the thickness of a film formed on the surfaces of the reinforcing fibers (A) by the surface treatment agent may be, for example, from 10 to 150 nm.

Examples of the method of adding the surface treatment agent to the reinforcing fibers (A) include a method in which the reinforcing fibers (A) are immersed in the surface treatment agent via a roller, and a method in which the surface treatment agent is atomized, and sprayed to the reinforcing fibers (A). It is preferable that the surface treatment agent is diluted with a solvent or the temperature, the yearn tension or the like in addition of the surface treatment agent is controlled so that the deposition amount of the surface treatment agent on the reinforcing fibers (A) becomes more uniform. Examples of the solvent to dilute the surface treatment agent include water, methanol, ethanol, dimethylformamide, dimethylacetamide and acetone, and water is preferable from the viewpoint of ease of handling and disaster prevention. The solvent is evaporated by heating and removed after the surface treatment agent is added to the reinforcing fibers (A). When a compound insoluble or hardly soluble in water is used as the surface treatment agent, it is preferable that the compound is dispersed in water with an emulsifier or surfactant added thereto. As the emulsifier or surfactant, anionic emulsifiers, cationic emulsifiers, nonionic emulsifiers and the like can be used. Among them, nonionic emulsifiers which have low interactivity are preferably used because they hardly hinder the effect of the surface treatment agent.

Among these types of reinforcing fibers, one type of reinforcing fibers may be used, or two or more types of reinforcing fibers may be used. Among them, carbon fibers such as PAN-based, pitch-based and rayon-based carbon fibers which are excellent in specific strength and specific rigidity are preferably used from the viewpoint of a weight reducing effect. Among them, PAN-based carbon fibers which are excellent in dynamic characteristics such as the strength and the elastic modulus can be preferably used.

Further, when carbon fibers are used, the surface oxygen concentration ratio (O/C) that is a ratio of the number of atoms of oxygen (O) to carbon (C) on the fiber surface as measured by X-ray photoelectron spectroscopy (XPS) is preferably 0.05 to 0.50, more preferably 0.08 to 0.40, further preferably 0.10 to 0.30. Higher the surface oxygen concentration ratio (O/C), larger the number of functional groups on the carbon fiber surface so that bondability between carbon fibers and the matrix resin can be improved, but when the surface oxygen concentration ratio (O/C) is excessively high, the crystal structure of the carbon fiber surface may be ruptured to reduce the strength of carbon fibers themselves and therefore a molded article that is particularly excellent in dynamic characteristics can be obtained when the surface oxygen concentration ratio (O/C) is in the above-mentioned preferred range.

The surface oxygen concentration ratio (O/C) is determined in accordance with the following procedure by X-ray photoelectron spectroscopy. First, carbon fibers freed of impurities by a solvent are cut, and spread and arranged on a sample supporting stand made of copper, the photoelectron escape angle is then set to 90°, and the inside of a sample chamber is kept at $1\times10^{-8}$ Torr with $MgK_{\alpha1,2}$ used as an X-ray source. The kinetic energy value (K.E.) at the main peak of C1S is matched to 969 eV as a correction of a peak associated with charging during measurement. The C1S peak area is determined by drawing a straight baseline over the range of 958 to 972 eV as K.E. The O1S peak area is determined by drawing a straight baseline over the range of 714 to 726 eV as K.E. The surface oxygen concentration ratio (O/C) is calculated as the ratio of the number of atoms from the ratio of the O1S peak area and the C1S peak area using an apparatus-specific sensitivity correction value.

The reinforcing fibers (A) may be used as a reinforcing fiber bundle with a plurality of monofilaments bundled together from the viewpoint of handling characteristics. The number of monofilaments that form the reinforcing fiber bundle is preferably not less than 100 and not more than 350,000, more preferably not less than 1,000 and not more than 250,000, further preferably not less than 10,000 and not more than 100,000 from the viewpoint of handling characteristics. When the number of monofilaments that form the reinforcing fiber bundle is in the above-mentioned range, the molded article is obtained with good economy.

The method of controlling the surface oxygen concentration ratio (O/C) is not particularly limited and, for example, methods such as an electrolytic oxidation treatment, a chemical oxidation treatment and a gas phase oxidation treatment can be employed, with the electrolytic oxidation treatment being preferable.

Condition (II) is that the number average fiber length of the reinforcing fibers (A) in the molded article is 0.4 to 10 mm. When the number average fiber length of the reinforcing fibers (A) in the molded article is 0.4 to 10 mm, the effect and efficiency of reinforcing the matrix resin (B) with the reinforcing fibers (A) in the molded article can be improved to sufficiently increase the tensile strength of the molded article and, in addition, the added amount of the reinforcing fibers (A) can be reduced, leading to excellent balance with molding processability. The number average fiber length of the reinforcing fibers (A) is more preferably 0.5 to 7 mm, further preferably 0.6 to 5 mm, especially preferably 0.6 to 2 mm. It is preferable that the number average fiber length of the reinforcing fibers (A) is in such a range because excellent fluidity is achieved in production of a molded article having a complicated shape and, further, for example, both the molding fluidity in recycling of the molded article and the strength of the recycled molded article can be secured.

The method of measuring the number average fiber length in the molded article will now be described. Examples of the method of measuring the number average fiber length of the reinforcing fibers (A) contained in the molded article include a method in which resin components contained in the molded article are removed by a dissolution method or a burn-off method, the remaining reinforcing fibers (A) are separated by filtration, and a measurement is then made by microscope observation, and a method in which the molded article is stretched and made thin by a melting method, and the reinforcing fibers (A) are transparently observed to make a measurement. In the measurement, 400 reinforcing fibers (A) are randomly selected, the lengths thereof are measured to a unit of 1 μm using an optical microscope, and the total of the fiber lengths is divided by the number of the fibers to calculate the number average fiber length. The obtained result does not significantly vary depending on a method of extracting the reinforcing fibers (A) from the molded article such as a melting method, a burn-off method or a dissolution method.

The preferred condition in the molded article is that the ratio of the number of fibers dispersed in the form of monofilaments to the number of the reinforcing fibers (A) (fiber dispersion ratio P) is 90 to 100%. The phrase "sufficiently dispersed in the form of monofilaments" refers to a state in which the fiber dispersion ratio P is 90 to 100%. To efficiently exhibit the reinforcing effect of the reinforcing fibers (A), it is important that the reinforcing fibers (A) are dispersed in the form of monofilaments in the molded article. The phrase "dispersed in the form of monofilaments" refers to a state in which a plurality of neighboring reinforcing fiber monofilaments is not parallel to one another in the length direction thereof, or are parallel to one another, but are not in contact with one another. When a plurality of neighboring reinforcing fiber monofilaments is parallel to and in contact with one another, they are in the form of a bundle. When a large number of reinforcing fibers in the form of a bundle exist, the end portions of the reinforcing fibers (A) on which stress is easily concentrated expand in the form of a bundle, and cracking that may cause breakage easily occurs from the portions so that the tensile characteristics of the resulting molded article are deteriorated. The reinforcing fibers (A) in the form of a bundle are hard to be impregnated with the matrix resin (B) to the inside of the bundle so that voids are generated, leading to deterioration of the tensile characteristics of the resulting molded article.

The ratio of the number of reinforcing fibers (A) dispersed in the form of monofilaments is evaluated by the fiber dispersion ratio P. The fiber dispersion ratio P is calculated from the following equation on the basis of the number of reinforcing fiber monofilaments (t) having a two-dimensional intersection angle of 5° or more as measured at an acute angle of 0° to 90° when the surface of the molded article is observed with a microscope, the two-dimensional intersection angle being formed by any reinforcing fiber monofilament (s) and a reinforcing fiber monofilament (t) neighboring the reinforcing fiber monofilament (s).

$$P = n/N \times 100 \text{(unit: \%)}$$

P: ratio of the number of reinforcing fibers (A) dispersed in the form of monofilaments (fiber dispersion ratio).

n: number of reinforcing fiber monofilaments having a two-dimensional intersection angle of 5° or more.

N: total number of reinforcing fiber monofilaments (t) subjected to measurement of two-dimensional intersection angle.

In the measurement, a reinforcing fiber monofilament (s) is randomly selected, and the two-dimensional intersection angle is measured for all reinforcing fiber monofilaments (t) that intersect the reinforcing fiber monofilament (s). The intersection angle is measured at an acute angle of 0° to 90°, and the ratio of reinforcing fiber monofilaments (t) having an intersection angle of 5° or more is calculated from the total number of reinforcing fiber monofilaments (t) subjected to measurement of the two-dimensional intersection angle. 100 reinforcing fiber monofilaments (s) are selected, and measurements are made.

Figure 2B:
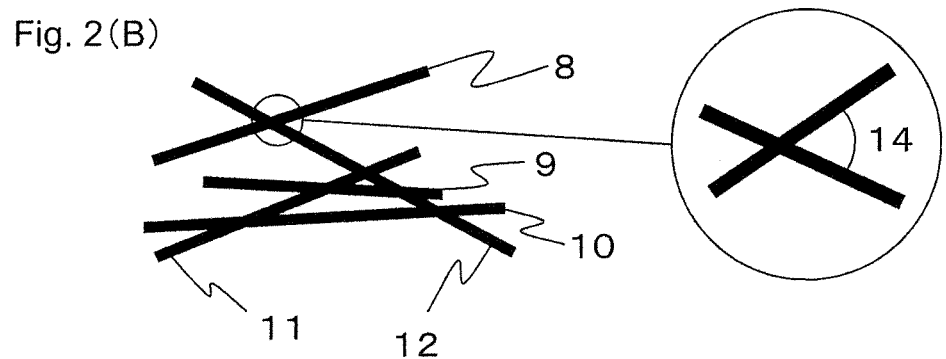

A portion where the two-dimensional intersection angle of the reinforcing fiber is measured is not particularly limited, but it is preferable that the end portion of the molded article is avoided, and a measurement is made at a portion which is as close as possible to the center of the molded article, and free from a shape of a boss, a rib or the like and a variation in thickness of the molded article. The specific observation method may be, for example, a method in which reinforcing fibers are observed from the surface of the molded article. It is preferable that the surface of the molded article is polished to a depth of about 100 μm to expose fibers because the reinforcing fibers are more easily observed. The fiber surfaces of the reinforcing fiber monofilament (s) and the reinforcing fiber monofilament (t) which are observed are not necessarily required to be in contact with each other, and those that intersect at the observation surface when overlooked are employed for measurement. Specifically, in FIG. 2(a), a reinforcing fiber monofilament 8 intersects reinforcing fiber monofilaments 12 and 13 when the reinforcing fiber monofilament 8 is defined as a reference. The two-dimensional intersection angle between the reinforcing fiber monofilament 8 and the reinforcing fiber monofilament 12 is denoted by reference numeral 14. Similarly, in FIG. 2(b), the reinforcing fiber monofilament 8 intersects only the reinforcing fiber monofilament 12 when the reinforcing fiber monofilament 8 is defined as a reference. The two-dimensional intersection angle between the reinforcing fiber monofilament 8 and the reinforcing fiber monofilament 12 is denoted by reference numeral 14.

Condition (III) is that the tensile elongation of the matrix resin (B) mainly including a polyarylene sulfide is 1.5 to 10%. When the tensile elongation is 1.5 to 10%, the tensile strength of the reinforcing fibers (A) themselves can be efficiently utilized due to a balance in elongation between the reinforcing fibers (A) and the matrix resin (B). When the tensile elongation is less than 1.5%, the matrix resin has a low elongation and, therefore, the resin is ruptured before the potential of the reinforcing fibers is sufficiently exhibited so that the tensile strength of the molded article cannot be sufficiently exhibited. From such a point of view, the tensile elongation of the matrix resin (B) is preferably 2.0% or more, more preferably 2.5% or more. When the tensile elongation is more than 10%, the polyarylene sulfide as a main component of the matrix resin has a large molecular weight, resulting in poor fluidity during molding. When fluidity during molding is deteriorated, damage occurs during molding to decrease the fiber length of the reinforcing fibers (A), and voids are generated so that the tensile strength of the resulting molded article is reduced. From such a point of view, the tensile elongation of the matrix resin (B) is preferably 4% or less, more preferably 3% or less.

The tensile elongation of the matrix resin (B) refers to a breaking point strain measured from a Type-I dumbbell test piece using a strain gauge in conformity with ASTM D638.

The polyarylene sulfide as a main component of the matrix resin (B) is a homopolymer or a copolymer having a repeating unit of the formula —(Ar—S)— as a main constituent unit and contains preferably 80 mol % or more, more preferably 90 mol % or more, further preferably 95 mol % or more of the repeating unit (hereinafter, the polyarylene sulfide will be sometimes abbreviated as PAS). Examples of Ar include units represented by formulae (a) to (k), and units represented by formula (a) are especially preferable.

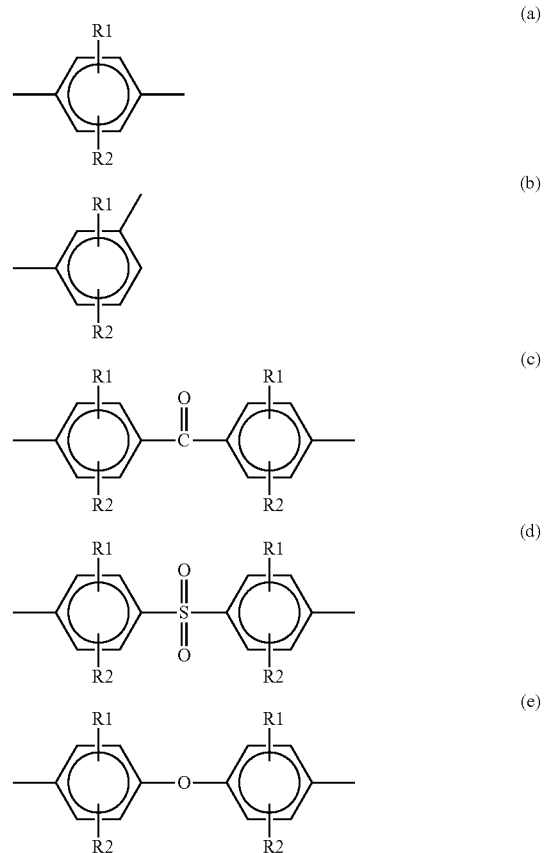

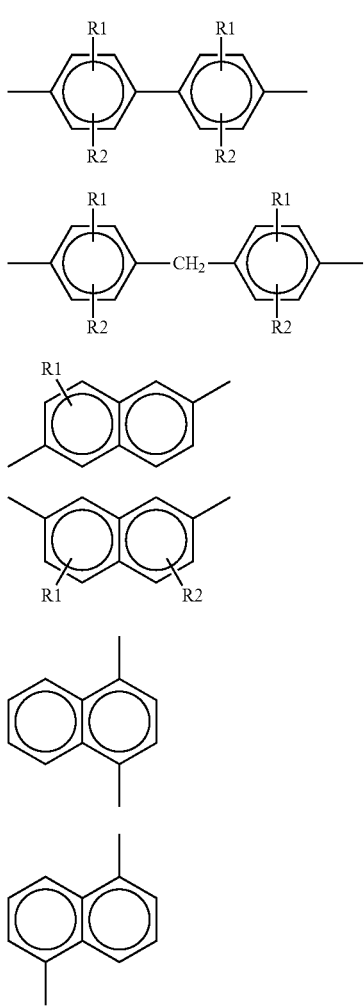

wherein R1 and R2 each represent a substituent selected from hydrogen, an alkyl group having 1 to 12 carbon atoms, an alkoxy group having 1 to 12 carbon atoms, an arylene group having 6 to 24 carbon atoms, and a halogen group, and R1 and R2 may be the same, or different.

As long as the polyarylene sulfide has the above-mentioned repeating unit as a main constituent unit, it may contain a small amount of branched units or crosslinked units represented by formulae (I) to (n). The copolymerization amount of branched units or crosslinked units is preferably 0 to 1 mol % based on 1 mol of the —(Ar—S)— unit.

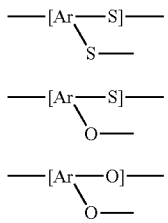

The PAS may be any one of a random copolymer and a block copolymer including the above-mentioned repeating unit, and a mixture thereof.

Typical examples of the PAS include polyphenylene sulfides (formulae (a), (b) and (f) to (k)), polyphenylene sulfide sulfones (formula (d)), polyphenylene sulfide ketones (formula (c)), polyphenylene sulfide ethers (formula (e)), random copolymers and block copolymers thereof, and mixtures thereof. Examples of the particularly preferred PAS include polyphenylene sulfides containing 80 mol % or more, particularly 90 mol % or more of a p-phenylene sulfide unit:

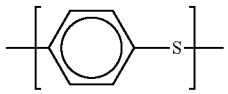

as a main constituent unit of the polymer (hereinafter, the polyphenylene sulfide will be sometimes abbreviated as a PPS).

The PAS has a mass average molecular weight of preferably 10,000 to 80,000, more preferably 10,000 to 60,000, further preferably 10,000 to 40,000. A PAS having a smaller mass average molecular weight has a lower melt viscosity, is superior in moldability into a complicated shape, and can more reliably inhibit the fiber length of the reinforcing fibers (A) from decreasing due to damage during molding.

The mass average molecular weight of the PAS can be measured using generally known GPC (gel permeation chromatography) such as size exclusion chromatography (SEC). The mass average molecular weight of the PAS can be determined by calculating the mass average molecular weight in terms of polystyrene with 1-chloronaphthalene used as an eluent and the column temperature set to 210° C.

Condition (IV) is that the interfacial shear strength between the reinforcing fibers (A) and the matrix resin (B) mainly including a PAS is 20 MPa or more. Bondability between the reinforcing fibers (A) and the matrix resin (B) is represented by the interfacial shear strength (hereinafter, the interfacial shear strength will be sometimes abbreviated as IFSS), and when the bondability is high, the IFSS shows a high value. It is important that the IFSS is 20 MPa or more to improve the tensile strength of the molded article. When the IFSS is less than 20 MPa, a load applied to the molded article is transmitted from the matrix resin (B) to the reinforcing fibers (A) and, before the reinforcing fibers (A) are sufficiently burdened with the load, the interface between the reinforcing fibers (A) and the matrix resin (B) is ruptured so that the tensile strength of the molded article cannot be sufficiently exhibited. From the point of view described above, the IFSS is more preferably 25 MPa or more, especially preferably 35 MPa or more. The IFSS varies depending on the characteristics of the matrix resin (B) to be used, but as long as the IFSS is not less than 50 MPa, a molded article having a sufficiently increased tensile strength can be provided. When the IFSS is in such a range, advantages resulting from improvement of the tensile strength of the reinforcing fibers (A) and the tensile elongation of the matrix resin (B) can be effectively exhibited.

Evaluation of the IFSS will now be described in detail. For evaluation of the IFSS, reference has been made to Drzal, L.T., Material of Science Engineering (Mater. Sci. Eng.), Vol. A126, 1990, page 289. One reinforcing fiber monofilament having a length of 20 cm is taken out from a reinforcing fiber bundle. Subsequently, two 150 μm-thick matrix resin films having a size of 20×20 cm square are prepared, the reinforcing fiber monofilament taken out from the reinforcing fiber bundle is linearly disposed on one of the matrix resin films. The other matrix resin film is superimposed thereon to sandwich the reinforcing fiber monofilament between the matrix resin films, and pressing is performed at a pressure of 0.5 MPa at 320° C. for 3 minutes to prepare a sample with a reinforcing fiber monofilament embedded in a matrix resin. The obtained sample is cut to obtain a sample piece having a thickness of 0.2 mm, a width of 10 mm and a length of 70 mm with a reinforcing fiber monofilament buried at the center. Ten test pieces are prepared in the same manner as described above.

Using a usual tension test tool, the test piece is subjected to a tension test at a strain rate of 0.5 mm/min with the test length set to 25 mm. The lengths of all the fragments of the reinforcing fiber monofilament at the time when the reinforcing fiber monofilament is no longer broken is measured with a transmission microscope, and the measured lengths are averaged to determine an average breakage fiber length L. The IFSS ($\tau$) is determined from the following equations:

$$\tau = (\sigma f \cdot d)/(2 \cdot Lc)$$

$$Lc = (4/3) \cdot L$$

$\tau$: IFSS (interfacial shear strength) (unit: MPa)
L: average breakage fiber length (unit: μm)
$\sigma f$: tensile strength of reinforcing fiber monofilament (unit: MPa)
d: diameter of reinforcing fiber monofilament (unit: μm).

$\sigma f$ is determined by the following method on the premise that the tensile strength distribution of the reinforcing fiber monofilament follows the Weibull distribution. Specifically, only the reinforcing fiber monofilament is subjected to a tension test without embedding the reinforcing fiber monofilament in the matrix resin, a relational expression between the sample length and the average tensile strength is derived by a least square method from the average tensile strength obtained with each of the sample lengths of 5 mm, 25 mm and 50 mm, and the average tensile strength at a sample length Lc is calculated.

It is preferable that the matrix resin (B) contains 0.1 to 10% by mass of a compound having, in one molecule, three or more functional groups of at least one type selected from a carboxyl group, an amino group, a hydroxyl group and an epoxy group for improving interfacial bondability between the reinforcing fibers (A) and the matrix resin (B) to improve the tensile strength of the molded article. The content of the compound is more preferably 0.2 to 8% by mass, especially preferably 0.6 to 5% by mass. Two or more of types of the functional groups may exist in one molecule, or two or more compounds having three or more functional groups of one type in one molecule may be used in combination.

The compound having, in one molecule, three or more functional groups as described above is preferably an aliphatic compound. The aliphatic compound is an acyclic linear saturated hydrocarbon, a branched saturated hydrocarbon, a cyclic saturated hydrocarbon, an acyclic linear unsaturated hydrocarbon, a branched unsaturated hydrocarbon, or a compound of chain structure in which a carbon atom ($CH_3$, $CH_2$, CH or C) in the hydrocarbon is replaced by an oxygen atom (O), a nitrogen atom (NH or N) or a carbonyl atom group (CO). The aliphatic compound does not have an aromatic backbone such as a benzene ring. It is preferable that the compound having, in one molecule, three or more specific functional groups as described above is an aliphatic compound because affinity between the reinforcing fibers (A) and the matrix resin (B) is improved so that a molded article excellent in dynamic characteristics is obtained.

Specific examples of the compound having, in one molecule, three or more specific functional groups as described above include polyfunctional epoxy resins, acrylic acid-based polymers, polyhydric alcohols and polyethyleneimines, and in particular, polyfunctional epoxy resins having high reactivity with both the surface functional groups of the reinforcing fibers (A) and the matrix resin (B) are preferably used.

Examples of the polyfunctional epoxy resin include tri- or-more functional aliphatic epoxy resins and phenol novolac-type epoxy resins. Among them, tri-or-more functional aliphatic epoxy resins are preferable because they have a plurality of reaction points and hence high reactivity so that affinity between the reinforcing fibers (A) and the matrix resin (B) are improved. The tri-or-more functional aliphatic epoxy resin means an aliphatic epoxy resin having three or more epoxy groups in one molecule.

Specific examples of the tri-or-more functional aliphatic epoxy resin include polyglycidyl ethers of aliphatic polyhydric alcohols such as glycerol triglycidyl ether, diglycerol polyglycidyl ether, polyglycerol polyglycidyl ether, sorbitol polyglycidyl ether, arabitol polyglycidyl ether, trimethylolpropane triglycidyl ether and pentaerythritol polyglycidyl ether. Among these aliphatic epoxy resins, glycerol triglycidyl ether, diglycerol polyglycidyl ether and polyglycerol polyglycidyl ether are preferably used because they contain a large number of epoxy groups having high reactivity in one molecule, have high water solubility, and are easily applied to the reinforcing fibers (A).

The acrylic acid-based polymer is a generic name of polymers which are polymers of acrylic acid, methacrylic acid and maleic acid, and contain three or more carboxyl groups in one molecule. Specific examples of the acrylic acid-based polymer include polyacrylic acids, copolymers of acrylic acid and methacrylic acid, copolymers of acrylic acid and maleic acid, and mixtures of two or more thereof. Further, the acrylic acid-based polymer may be one with the carboxyl group partially neutralized with an alkali (i.e., formed into a carboxylate) as long as the number of functional groups as described above is 3 or more in one molecule. Examples of the alkali include alkali metal hydroxides such as sodium hydroxide, lithium hydroxide and potassium hydroxide, and ammonium hydroxide. As the acrylic acid-based polymer, a polyacrylic acid containing a larger number of carboxyl groups in one molecule is preferably used.

Specific examples of polyhydric alcohol include polyvinyl alcohol, glycerol, diglycerol, polyglycerol, sorbitol, arabitol, trimethylolpropane and pentaerythritol. As the polyhydric alcohol, a polyvinyl alcohol containing a larger number of hydroxyl groups in one molecule can be preferably used.

The polyethyleneimine is a polyamine obtained by ring-opening polymerization of ethylene imine, and has a branched structure formed by primary, secondary and tertiary amino groups. As the polyethyleneimine, a polyethyleneimine containing a larger number of amino groups in one molecule is preferably used.

The compound having, in one molecule, three or more specific functional groups as described above is preferably one in which the value obtained by dividing the mass average molecular weight of the compound by the number of the above-described functional groups (the total number of carboxyl groups, amino groups, hydroxyl groups and epoxy groups) in one molecule is 40 to 150. It is preferable that the above-mentioned value is in such a range because the density of reaction points with the surface functional groups of the reinforcing fibers (A) and the functional groups of the matrix resin (B) can be made more uniform, and affinity between the reinforcing fibers (A) and the matrix resin (B) can be improved to further increase the tensile strength of the resulting molded article.

It is preferable that the matrix resin (B) further contains 0.1 to 10% by mass of a compound having, in one molecule, two or more structures of at least one type selected from a carbodiimide structure, a urea structure and a urethane structure for further improving affinity between the reinforcing fibers (A) and the matrix resin (B) so that the tensile characteristics of the resulting molded article is improved. The blending amount is preferably 0.3 to 8% by mass, and especially preferably 0.5 to 5% by mass in view of generation of a decomposed gas at the time of kneading the compound with the matrix resin.

Examples of the compound having a carbodiimide structure, i.e., the carbodiimide compound, include polycarbodiimides, which include aliphatic polycarbodiimides and aromatic polycarbodiimides, and aliphatic polycarbodiimides are preferably used from the viewpoint of affinity and reactivity with the reinforcing fibers (A) and the matrix resin (B).

The aliphatic polycarbodiimide compound is a homopolymer or a copolymer which has as a main constituent unit a repeating unit represented by the general formula —N=C=N—$R_3$— (wherein $R_3$ represents a divalent organic group of a cycloaliphatic compound such as cyclohexylene, or a divalent organic group of an aliphatic compound such as methylene, ethylene, propylene or methylethylene) and contains preferably 70 mol % or more, more preferably 90 mol % or more, further preferably 95 mol % or more of the repeating unit.

As the compound having a urea structure, one obtained by reacting a diisocyanate with a diamine including a compound containing a plurality of amino groups (e.g., hydrazine, dihydrazide or the like) can be used. Alternatively, the polyurea can be synthesized by reacting an isocyanate with water to form unstable carbamic acid. The carbamic acid is decomposed to generate carbon dioxide and form amino groups that immediately react with an isocyanate to form a urea bridge. Alternatively, the polyurea is obtained by treating a compound having a carbodiimide structure with water to react the carbodiimide into urea.

As the compound having a urethane structure, one obtained by reacting bischloroformate with diamine can be used. Alternatively, the polyurethane can be synthesized by reacting a diisocyanate with a diol such as a macroglycol, a polyol, or a combination of a macroglycol and a single-chain glycol extending agent.

Among compounds having structures as described above, polycarbodiimides are preferably used from the viewpoint of interfacial bonding to the reinforcing fibers (A).

When the PAS as a main component of the matrix resin (B) has a smaller mass average molecular weight, it has a lower melt viscosity, and is superior in molding processability in production of a molded article as described above. When a PAS having a smaller mass average molecular weight is used in the molded article, the dynamic characteristics such as the tensile strength and the elongation, of the resulting molded article tend to be improved. This may be because functional groups of the PAS chemically react with functional groups existing on the surfaces of reinforcing fibers. For these reasons, it is especially preferable that the mass average molecular weight of the PAS as a main component of the matrix resin (B) is 10,000 to 40,000 in the molded article because both the dynamic characteristics of the resulting molded article and the molding processability can be achieved at a high level.

Further, when the matrix resin (B) is a carbodiimide-modified polyarylene sulfide obtained from a polyarylene sulfide and a carbodiimide compound, the matrix resin (B) having a high tensile elongation is obtained even when the polyarylene sulfide has a small mass average molecular weight. Since the mass average molecular weight of the polyarylene sulfide is small, it is easy to combine the reinforcing fibers (A) and the matrix resin (B), and the number average fiber length of the reinforcing fibers (A) in the resulting molded article is increased so that a molded article having a high strength is obtained. For these reasons, when the matrix resin (B) is a carbodiimide-modified polyarylene sulfide obtained from a polyarylene sulfide and a carbodiimide compound in the molded article, it is especially preferable that the mass average molecular weight of the polyarylene sulfide is 10,000 to 40,000 because both the tensile strength and productivity of the resulting molded article and the molding processability can be achieved at a high level.

In the PAS, the content of volatile components when the PAS is heated and melted at 320° C. for 120 minutes is preferably 0.8% by mass or less from the viewpoint of a work environment during molding, and to reduce generation of voids in the molded article, and preventing contamination due to generation of gas on the metal side when the molded article is used integrally with a metal member of aluminum or the like, or used in combination with a metal member having an elevated temperature at a use site. The content of volatile components is further preferably 0.5% by mass or less. The amount of volatile components can be measured from a mass decrease ratio with respect to the mass of a sample before measurement when the PAS is heated at a temperature elevation rate of 20° C./minute at a nitrogen flow rate of 30 mL/minute, and then held at 320° C. for 120 minutes using Differential Thermal Balance (TG-DTA) Standard Model CN8078B1 manufactured by Rigaku Corporation.

In the molded article, the average of fiber lengths observed from the breakage cross-section after tension breakage of the molded article is preferably 0.2 mm or less because a sufficient effect of improving the tensile strength of the molded article is obtained. Usually, in a molded article including the matrix resin (B) and the reinforcing fibers (A), a state in which the reinforcing fibers (A) falls off the matrix resin (B) is observed when a breakage surface after a tension test is observed. This may be because surface bondability between the matrix resin (B) and the reinforcing fibers (A) is not sufficient. There is a certain correlation between the length of the reinforcing fiber (A) that falls off the matrix resin and the tensile strength, and the fiber length sufficient for exhibiting the tensile strength is usually called a critical fiber length. It suffices that the average of fiber lengths is 0.2 mm or less from the viewpoint of a critical fiber length, and the average of fiber lengths is more preferably 0.15 mm or less, especially preferably 0.1 mm or less.

The method of measuring the average of fiber lengths observed from the breakage cross-section of the molded article after tension breakage will now be described with reference to FIG. 1. A test piece is disposed such that the breakage surface after a tension test is level with a sample stand, and fiber lengths at the surface area are observed using a scanning electron microscope. Contact ends (7 in FIG. 1(a)) between a reinforcing fiber monofilament (3 in FIG. 1(a)) protruding from the breakage surface and the matrix resin (B) are connected by a straight line, a perpendicular line is drawn from the center of the straight line to the tip of the protruding reinforcing fiber monofilament (4 in FIG. 1(*a*)), and the length of the perpendicular line is measured to a unit of 1 μm. A measurement can be made in the same manner as described above even when the reinforcing fiber monofilament is covered with the matrix resin (B) (FIG. 1(*b*)). The average of fiber lengths can be determined by measuring the fiber length for up to 400 fibers in total, and dividing the total of the measured lengths by the number of the fibers. If the number of measurable reinforcing fibers in one test piece is less than 400, or 400 reinforcing fibers exist, but it is difficult to measure 400 fibers, the number of samples may be increased to measure 400 fibers in total.

Preferably, the molded article is in a state in which the matrix resin (B) is deposited on the surfaces of the reinforcing fibers (A) observed from the breakage cross-section after tension breakage of the molded article. The state can be evaluated by the ratio of the number of reinforcing fibers (A) with the lumped matrix resin (B) deposited on at least a part of the surface to the number of reinforcing fibers (A) observed from the breakage cross-section. The ratio of reinforcing fibers (A) with the matrix resin (B) deposited on the surface is preferably 10% or more, further preferably 40% or more, more preferably 70% or more. This ratio is preferably as high as possible because the bonding strength between the reinforcing fibers (A) and the matrix resin (B) becomes higher so that the effect by improvement of the tensile strength of the matrix resin (B) can be effectively exhibited.

The ratio of reinforcing fibers (A) with the matrix resin (B) deposited on the surface is measured in the following manner: test piece is disposed such that the breakage surface after a tension test is level with a sample stand, total 400 reinforcing fiber (A) monofilaments protruding from the breakage surface are observed using a scanning electron microscope, the number of reinforcing fiber (A) monofilaments with the lumped matrix resin (B) deposited on at least a part of the surface is measured, and the ratio of reinforcing fibers (A) with the matrix resin (B) deposited on the surface is determined using the following equation:

$$Q = w/M \times 100 (\text{unit: \%})$$

Q: ratio of reinforcing fibers (A) with the lumped matrix resin (B) deposited on at least a part of the surface w: number of reinforcing fiber (A) monofilaments with the lumped matrix resin (B) deposited on at least a part of the surface M: total number of reinforcing fiber (A) monofilaments observed for deposition of the matrix resin (B).

From the viewpoint of ease of processing into a complicated shape, storage stability and productivity, the method of producing the molded article is preferably a method in which a molding material is provided beforehand, and molded and processed to produce a molded article. The first preferred method of producing a molding material is, for example, a method in which the reinforcing fibers (A) and the matrix resin (B) are simultaneously melted and kneaded, then cooled in a strand bath, and cut to be pelletized, and the second preferred method of producing a molding material is a method in which a base material formed of the reinforcing fibers (A) is impregnated and/or covered with the melted matrix resin (B), then cooled, and cut to a pellet shape. When the third component is added, mention is made of, for example, a method in which the third component is added to the reinforcing fibers (A) beforehand (sizing method), and a method in which the third component is dry-blended with the matrix resin (B).

In the first method of producing a molding material, the melting and kneading method is not particularly limited, and a known heating, melting and mixing apparatus can be used. Specifically, a single-screw extruder, a twin-screw extruder, a twin-screw extruder including a combination of a single-screw extruder and a twin-screw extruder, a kneader extruder or the like can be used. Particularly, a twin-screw extruder is preferably used from the viewpoint of mixing power, and a twin-screw extruder having two or more kneading zones is more preferably used. The kneading zone is a region including one or more kneading disks installed in a screw of a twin-screw extruder and having a higher effect of dispersing the reinforcing fibers (A) in the form of monofilaments and a higher effect of decreasing the number average fiber length as compared to other zones. Accordingly, it is preferable to control kneading zones, and the total length of the kneading zones is preferably 1 to 30%, further preferably 1 to 20%, more preferably 1 to 15% of the full length of the screw. Regions other than kneading zones are preferably full-flight zones including one or more full-flights installed in the screw.

As the twin-screw extruder, one having a (screw length)/(screw diameter) ratio of 20 to 100 is preferably selected from the view point of productivity. The cylinder temperature in melting and kneading is preferably 250 to 400° C., further preferably 280 to 350° C. It is preferable that the cylinder temperature is in such a temperature range because breakage of the reinforcing fibers (A) during melting and kneading is suppressed so that the length of the reinforcing fibers (A) in the resulting molding material and molded article can be increased.

The form of the reinforcing fibers (A) at the time of putting the reinforcing fibers (A) in the heating, melting and mixing apparatus may be either a continuous fiber form or a discontinuous fiber form in which the fibers are cut to a specific length. When the reinforcing fibers (A) are put in the heating, melting and mixing apparatus directly in the form of continuous fibers (direct robing), breakage of the reinforcing fibers (A) is suppressed so that the fiber length can be secured in the molding material and the molded article, and therefore a molded article excellent in dynamic characteristics can be obtained. The step of cutting the reinforcing fibers (A) can be omitted and, therefore, productivity is improved.

In the preferred aspect of the molding material obtained in the first method, the reinforcing fibers (A) are dispersed in the form of monofilaments in the molding material. It is preferable that the reinforcing fibers (A) are dispersed beforehand because breakage of the reinforcing fibers (A) can be reduced in the process of molding the molding material into a molded article.

In the second method of producing a molding material, specific examples of the base material formed of the reinforcing fibers (A) may include reinforcing fiber bundles formed by bunching the continuous reinforcing fibers (A) (hereinafter, referred to simply as a reinforcing fiber bundle), base materials in which continuous reinforcing fibers are unidirectionally oriented (hereinafter, referred to simply as a unidirectionally arranged base material), woven fabrics (cloths), nonwoven fabrics, mats, knitted fabrics, braids, yarns and tows. Among them, reinforcing fiber bundles are preferably used because they can be continuously taken up at a high speed, leading to excellent productivity.

Since the reinforcing fiber bundle becomes more advantageous in economy as the number of reinforcing fiber (A) monofilaments increases, the number of monofilaments is preferably 10,000 or more. On the other hand, since the reinforcing fiber bundle tends to become more disadvantageous for impregnability of the matrix resin (B) as the number of reinforcing fiber (A) monofilaments increases, the number of monofilaments is more preferably not less than 10,000 and not more than 100,000, especially preferably not less than 10,000 and not more than 50,000 for securing both economy and impregnability.

The method of melting the matrix resin (B) may be, for example, a method using heating, melting and mixing apparatus. The base material formed of the reinforcing fibers (A) can be impregnated and/or covered with the matrix resin (B) by feeding the melted matrix resin (B) to an impregnation tank, and bringing the matrix resin (B) into contact with the base material formed of the reinforcing fibers (A). The impregnation tank is a vessel including a mechanism capable of continuously carrying out a step of immersing in the melted matrix resin (B) the base material formed of the reinforcing fibers (A), and taking up the base material. Preferably, the impregnation tank further includes a heating source to store the matrix resin (B) in a melted state for a predetermined period of time. Preferably, the impregnation tank further includes therein a slit structure in which the spacing of a cavity is inclined, a movable roll or a stationary bar for improving the effect of impregnating the gaps between reinforcing fiber (A) monofilaments with the matrix resin (B).

In the second method of producing a molding material, the mass average molecular weight of the PAS as a main component of the matrix resin (B) is preferably small because the base material formed of the reinforcing fibers (A) is easily impregnated with the matrix resin (B). The mass average molecular weight of the PAS which satisfies such a condition may be, for example, 10,000 to 40,000.

Figure 3:
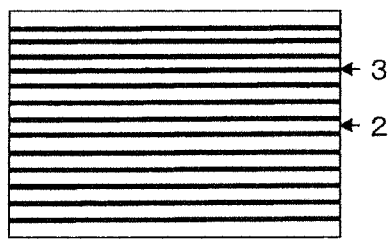
FIG. 3 is a schematic view showing one example of a preferred aspect of a molding material.

In the preferred aspect of the molding material obtained in the second method, the reinforcing fibers (A) are arranged almost in parallel to the axial center direction of the molding material, and the length of the reinforcing fiber (A) is substantially the same as the length of the molding material as shown in FIG. 3. In FIG. 3, symbol 3 denotes a black area, and symbol 2 denotes a white area.

The phrase "arranged almost in parallel to" refers to a state in which the axis line of the major axis of the reinforcing fiber (A) and the axis line of the major axis of the molding material are directed in the same direction, and the angular deviation between the axis lines is preferably 20° or less, more preferably 10° or less, further preferably 5° or less. The phase "substantially the same length" means that, for example, in a pellet-shaped molding material, the reinforcing fiber (A) is not cut at some midpoint in the pellet, and reinforcing fibers (A) significantly shorter than the full length of the pellet are not substantially included. The amount of reinforcing fibers (A) shorter than the full length of the pellet is not particularly specified, but when the content of reinforcing fibers (A) having a length equal to or less than 50% of the full length of the pellet is 30% by mass or less, it is determined that reinforcing fibers (A) significantly shorter than the full length of the pellet are not substantially included. Further, the content of reinforcing fibers (A) having a length equal to or less than 50% of the full length of the pellet is preferably 20% by mass or less. The full length of the pellet is a length in the orientation direction of the reinforcing fibers (A) in the pellet. When the reinforcing fibers (A) have a length equivalent to that of the molding material, the fiber length of the reinforcing fibers (A) in the molded article can be increased so that excellent dynamic characteristics can be obtained.

The molding material allows the reinforcing fibers (A) to be dispersed in the form of monofilaments in the process of molding the molding material into a molded article, and the mass average molecular weight of the PAS as a main component of the matrix resin (B) is preferably small because breakage of the reinforcing fibers (A) is suppressed. The mass average molecular weight of the PAS which satisfies such a condition may be, for example, 10,000 to 40,000.

The number average fiber length of the reinforcing fibers (A) included in the molding material is preferably 4 to 10 mm. When the number average fiber length of the reinforcing fibers (A) is in the above-mentioned range, a molded article excellent in fluidity during molding and processing, has a large fiber length in the molded article, and is further excellent in tensile strength may be obtained. The number average fiber length can be measured by applying to the molding material the method of measuring the number average fiber length in the molded article. The second method is more preferable as a method of producing a molding material because a molding material as described above can be obtained with high productivity.

Preferably, the molded article is obtained by providing a molding material in the form of a pellet, and molding the molding material from the viewpoint of moldability. Examples of the molding method using the molding material include injection molding (injection compression molding, gas-assisted injection molding, insert molding and so on). Particularly, injection molding is preferably used from the viewpoint of productivity and moldability into a complicated shape. The cylinder temperature in injection molding is preferably 250 to 400° C., further preferably 280 to 350° C. The die temperature in injection molding is preferably 40 to 250° C., further preferably 120 to 200° C. When the cylinder temperature and the die temperature are in the above-mentioned ranges, respectively, breakage of the reinforcing fibers (A) during injection molding is suppressed so that the fiber length can be secured in the molded article and, therefore a molded article excellent in dynamic characteristics can be obtained. Molded articles can be obtained using these molding methods.

The molded articles may contain an impact resistance improving agent such as an elastomer or a rubber component, and other fillers and additives as long as the desired effect is not impaired. Examples of the additives include flame retardants, conductivity imparting agents, nucleating agents, ultraviolet absorbers, antioxidants, vibration controlling agents, antibacterial agents, insect repellents, deodorants, coloration preventing agents, heat stabilizers, mold release agents, antistatic agents, plasticizers, lubricants, colorants, pigments, dyes, foaming agents and antifoaming agents.

The molded articles are suitable as electronic device housings, and are suitably used in computers, televisions, cameras, audio players and the like.

The molded articles are suitable in electric and electronic component applications, and are suitably used in connector, LED lamps, sockets, optical pickups, terminal plates, printed boards, speakers, small motors, magnetic heads, power modules, power generators, electric motors, transformers, current transformers, voltage regulators, rectifiers, inverters and the like.

The molded articles are suitable for automobile components, vehicle related components and so on, and are suitably used in safety belt components, instrument panels, console boxes, pillars, roof rails, fenders, bumpers, door panels, roof panels, hood panels, trunk lids, door mirror stays, spoilers, hood louvers, wheel covers, wheel caps, garnishes, intake manifolds, fuel pumps, engine cooling water joints, wind washer nozzles, wipers, battery peripheral components, wire harness connectors, lamp housings, lamp reflectors, lamp sockets and the like.

The molded articles are suitable as building materials, and are suitably used in wall, roof and ceiling material related components, window material related components, heat insulator material related components, floor material related components, base isolation vibration damping member related components, lifeline related components and the like in civil engineering and construction products.

The molded articles are suitable as sporting goods, and are suitably used in golf related goods such as golf club shafts and golf balls, sports racket related goods such as tennis rackets and badminton rackets, body protection goods for sports such as masks, helmets, chest protectors, elbow pads and kneepads in American football, baseball, softball and the like, fishing tackle related goods such as fishing rods, reels and fishing lures, winter sports related goods such as skis and snowboards and the like.

EXAMPLES

Our articles and materials will be described further in detail below by way of examples. First, evaluation methods will be described below.

(1) Strand Tensile Strength of Reinforcing Fibers (A)

The strand tensile strength was determined in accordance with the following procedure in conformity with the resin impregnation strand test method in JIS R7608 (2007) using a reinforcing fiber bundle including reinforcing fibers (A).

As a resin composition, "CELLOXIDE (registered trademark)" 2021P (manufactured by Daicel Chemical Industries, Ltd.)/boron trifluoride monoethylamine (manufactured by Tokyo Chemical Industry Co., Ltd.)/acetone=100/3/4 (parts by mass) was used, and as curing conditions, curing was performed at normal pressure at 130° C. for 30 minutes. A measurement was made for each of ten strands in a reinforcing fiber bundle, and the average thereof was defined as a strand tensile strength.

(2) Number Average Fiber Length of Reinforcing Fibers (A) Contained in Molded Article and Molding Material A sample obtained by cutting a part of a molded article, or a molding material was heating-pressed at 300° C. to obtain a 30 μm-thick film. The obtained film was observed at a magnification of 25 to 150 depending on the fiber lengths of the reinforcing fibers (A) to be observed with an optical microscope, and fibers dispersed in the film were observed. The lengths of the fibers were measured to a unit of 1 m, and the number average fiber length (Ln) was determined from the following equation:

Number average fiber length$(Ln)=(\Sigma Li)/N$total $Li$: measured fiber length (i=1, 2, 3, . . . , n)
$N$total: total number of fibers subjected to measurement of fiber length.

(3) Measurement of Main Orientation Direction of Reinforcing Fibers (A) in Molded Article A molded article molded under the same conditions as those for a molded article subjected to a tension test is embedded in an epoxy resin. The surface of the embedded molded article was polished to a depth of 100 μm from the surface to prepare a test piece for observation. The polished surface of the molded article was observed with a microscope to determine the main orientation direction. On the microscope observation screen, any direction was set to a reference direction D, 400 reinforcing fiber monofilaments were randomly selected, and the angle α (unit: °) formed by each of the reinforcing fiber monofilaments with respect to the reference direction D was measured. Two angles α (acute angle and obtuse angle) were formed with respect to the reference direction D, and the angle α on the acute angle side ($-90° \leq \alpha \leq 90°$) was measured. Further, the angle α was considered as a positive angle when the acute angle was formed in a clockwise direction with respect to the reference direction D and, conversely, the angle α was considered as a negative angle when the acute angle was formed in a counterclockwise direction with respect to the reference direction D. Then, the sum of angles α ($\Sigma \alpha$) formed by the 400 measured reinforcing fiber monofilaments with respect to the reference direction D was determined, and divided by 400, i.e., the number of the measured monofilaments, to calculate the average of angles α. The direction along the most intense orientation in the molded article was considered as a direction at the average of angles α with respect to the reference direction D, and the direction along the most intense orientation was determined as a main orientation direction of reinforcing fibers in the molded article, and defined as 0°. A direction orthogonal to the direction 0° determined in this measurement was defined as 90°.

(4) Tension Test in Main Orientation Direction and Direction Orthogonal to Main Orientation Direction in Molded Article A tension test in the main orientation direction (0° direction) determined in (3) and a direction (90° direction) orthogonal to the main orientation direction was conducted in conformity with ASTM D638. In this test, a test piece processed into a Type-I dumbbell test piece was used, and "Instron (registered trademark)" Universal Tester Model (manufactured by Instron, Ltd.) was used as a tester. In this measurement, a value obtained in the following manner was used as the tensile strength: a load at a breakage point at which tension breakage of the test piece occurred in the measurement specified in ASTM D638 was divided by the cross-section area of a parallel part of the dumbbell test piece subjected to the test. For the tensile elongation, a breakage point strain measured using a strain gauge attached to the parallel part was used. When irregularities existed on a molded article, or the shape of the test piece did not conform to the above-mentioned specification, for example, the molded article was small, a tensile test piece equally scaled down while maintaining the shape with respect to a test piece size conforming to the specification was cut out from a molded article part having a flat plate shape wherever possible, and evaluation was performed.

(5) Ratio of the Number of Reinforcing Fibers (A) Dispersed in the Form of Monofilaments in Molded Article A part of a molded article was cut out, the test piece cut out from the molded article was embedded in an epoxy resin, and the surface of the molded article was polished to a depth of 100 μm from the surface to prepare a test piece for observation.

The test piece for observation from the molded article was observed with an optical microscope, a reinforcing fiber monofilament (s) serving as a reference was randomly selected, and the two-dimensional intersection angle was measured for all reinforcing fiber monofilaments (t) that was in contact with the reinforcing fiber monofilament (s). The two-dimensional contact angle was measured in an acute angle of 0° to 90°, and the ratio of reinforcing fiber monofilaments having a two-dimensional contact angle of 5° or more was calculated from the total number of reinforcing fiber monofilaments (t) subjected to measurement of the two-dimensional intersection angle. This measurement was repeated 100 times.

$$P=n/N\times100 (\text{unit: \%})$$

P: ratio of the number of reinforcing fibers (A) dispersed in the form of monofilaments (fiber dispersion ratio).
n: number of reinforcing fiber monofilaments having a two-dimensional intersection angle of 5° or more.
N: total number of reinforcing fiber monofilaments (t) subjected to measurement of two-dimensional intersection angle.

(6) Interfacial Shear Strength (IFSS) Between Reinforcing Fibers (A) and Matrix Resin (B)

For details of evaluation, reference was made to Drzal, L.T., Material of Science Engineering (Mater. Sci. Eng.), Vol. A126, 1990, page 289. One monofilament having a length of 20 cm was taken out from reinforcing fibers (A) used in each of Examples and Comparative Examples. Two resin films used in each of Examples and Comparative Examples were provided, and the monofilament taken out from the reinforcing fibers (A) was linearly disposed on one of the resin films. The other resin film was superimposed thereon to sandwich the monofilament between the matrix resin films, and pressing was performed at a pressure of 0.5 MPa at 320° C. for 3 minutes to prepare a sample with a monofilament embedded in a resin. The obtained sample was cut to obtain a sample piece having a thickness of 0.2 mm, a width of 10 mm and a length of 70 mm with a monofilament buried at the center. Ten test pieces were prepared in the same manner as described above. For the measurement of the IFSS, the reinforcing fibers (A) and matrix resin (B) used in each of Examples and Comparative Examples were combined to prepare a sample, and the sample was subjected to evaluation.

Using a usual tension test tool, the test piece was subjected to a tension test at a strain rate of 0.5 mm/min with the test length set to 25 mm. The lengths of all the fragments of the monofilament at the time when the monofilament was no longer broken were measured with a transmission microscope, and the measure lengths are averaged to determine an average breakage fiber length L.

The IFSS (τ) was determined from the following equations:

$$\tau=(\sigma f\cdot d)/(2\cdot Lc)$$

$$Lc=(4/3)\cdot L$$

τ: IFSS (interfacial shear strength) (unit: MPa)
L: average breakage fiber length (unit: μm) described above
σf: tensile strength of monofilament (unit: MPa)
d: diameter of reinforcing fiber monofilament (unit: μm).

σf was determined by the following method on the premise that the tensile strength distribution of the reinforcing fiber (A) would follow the Weibull distribution. Specifically, using reinforcing fiber (A) monofilaments, the tensile strength of each of the monofilaments having sample strengths of 5 mm, 25 mm and 50 mm was determined according to JIS R7606. Specifically, a reinforcing fiber bundle was divided into four equal parts, and 100 monofilaments were sequentially sampled from the four bundles. The monofilaments were sampled as equally as possible from the whole bundle. The sampled monofilaments were fixed on a perforated paste board using an adhesive. The paste board with the monofilaments fixed thereon was attached to a tension tester, and a tension test was conducted at a strain rate of 1 mm/min with a sample number of 100. A relational expression between the sample length and the average tensile strength was derived by a least square method from the average tensile strength obtained with each of the sample lengths, and the average tensile strength at a sample length Lc was calculated, and defined as σf.

(7) Tensile Elongation of Matrix Resin (B)

Using an injection molding machine (J150EII-P manufactured by JSW, Inc.), only the matrix resin (B) used in each of Examples and Comparative Examples were injection-molded to prepare a test piece for tension evaluation. The injection molding was performed at a cylinder temperature of 320° C. and a die temperature of 150° C. The measurement of tension elongation was made in conformity with ASTM D638. In the measurement, a Type-I dumbbell test piece was used, and "Instron (registered trademark)" Universal Tester Model (manufactured by Instron, Ltd.) was used as a tester. For the tensile elongation, a breakage point strain measured using a strain gauge attached to the parallel part was used as a measurement value.

(8) Mass Average Molecular Weight of PAS

The mass average molecular weight of a PAS was calculated as a mass average molecular weight (Mw) in terms of a polystyrene using gel permeation chromatography (GPC). GPC measurement conditions are shown below:

Apparatus: Senshu Scientific SSC-7100 (column brand: Senshu Scientific GPC3506)
Eluent: 1-chloronaphthalene, flow rate: 1.0 mL/min, column temperature: 210° C., detector temperature: 210° C.

(9) Fiber Length in Observation of Breakage Surface after Tension Test

A test piece was disposed such that the breakage surface after a tension test was level with a sample stand, and fiber lengths at the surface area were observed using a scanning electron microscope. Contact ends between a reinforcing fiber monofilament protruding from the breakage surface and the matrix resin (B) were connected by a straight line, a perpendicular line was drawn from the center of the straight line to the tip of the protruding reinforcing fiber monofilament, and the length of the perpendicular line was measured to a unit of 1 μm. A measurement was made in the same manner as described above even when the reinforcing fiber monofilament was covered with the matrix resin (B). The average of fiber lengths was determined by measuring the fiber length for up to 400 fibers in total, and dividing the total of the measured lengths by the number of the fibers.

(10) Deposition of Matrix Resin (B) on Surface of Reinforcing Fiber (A) at Breakage Surface after Tension Test A test piece was disposed such that the breakage surface after a tension test was level with a sample stand, and reinforcing fiber (A) monofilaments protruding from the breakage surface were observed using a scanning electron microscope. Total 400 reinforcing fiber (A) monofilaments were observed, and the number of reinforcing fiber (A) monofilaments with the lumped matrix resin (B) deposited on at least a part of the surface was measured. The ratio of reinforcing fibers (A) with the lumped matrix resin (B) deposited on at least a part of the surface was determined from the following equation, and evaluated in the following four grades, and samples rated "fair" to "excellent" were determined as passing.

$$Q=w/M\times100 (\text{unit: \%})$$

Q: ratio of reinforcing fibers (A) with the lumped matrix resin (B) deposited on at least a part of the surface w: number of reinforcing fiber (A) monofilaments with the lumped matrix resin (B) deposited on at least a part of the surface M: total number of reinforcing fiber (A) monofilaments observed for deposition of the matrix resin (B)

excellent: Q is 70% or more, and the bonding strength of the matrix resin (B) to the reinforcing fibers (A) is especially high.

good: Q is not less than 40% and less than 70%, and the bonding strength of the matrix resin (B) to the reinforcing fibers (A) is high.

fair: Q is not less than 10% and less than 40%, and the matrix resin (B) bonds to the reinforcing fibers (A).

bad: Q is less than 10%, and the matrix resin (B) does not bond to the reinforcing fibers (A).

Materials used in Examples and Comparative Examples will now be described.

Reinforcing Fibers (A)

(CF-1) A copolymer mainly including polyacrylonitrile was subjected to spinning, a firing treatment and a surface oxidation treatment to obtain a continuous carbon fiber strand with a total monofilament number of 12,000. The characteristics of the carbon fiber were as shown below:
  Tensile strength: 4900 MPa
  Tensile elastic modulus: 240 GPa
  Tensile elongation: 2%
  Specific gravity: 1.8
  diameter of monofilament: 7 μm.

(CF-2) pitch-based carbon fiber, "Dialead (registered trademark)" K223Y1 manufactured by Mitsubishi Plastics, Inc. was used. The characteristics of the carbon fiber were as shown below:
  Tensile strength: 1000 MPa
  Tensile elastic modulus: 50 GPa
  Tensile elongation: 1.8%
  Specific gravity: 1.5
  diameter of monofilament: 13 μm.

(GF-1) made of E-glass; a continuous glass fiber strand with a total monofilament number of 1600. The characteristics of the glass fiber were as shown below:
  Tensile strength: 3400 MPa
  Tensile elastic modulus: 72 GPa
  Tensile elongation: 3%
  Specific gravity: 2.6
  diameter of monofilament: 13 μm.

Surface Treatment Agent (SZ-1) bisphenol A diglycidyl ether (manufactured by SIGMA-ALDRICH Corporation)
  Mass average molecular weight: 340
  Number of epoxy groups per molecule: 2
  Value obtained by dividing the mass average molecular weight by the total number of carboxyl groups, amino groups, hydroxyl groups and epoxy groups per molecule: 170.

(SZ-2) glycerol triglycidyl ether (manufactured by Wako Pure Chemical Industries, Ltd.)
  Mass average molecular weight: 260
  Number of epoxy groups per molecule: 3
  Value obtained by dividing the mass average molecular weight by the total number of carboxyl groups, amino groups, hydroxyl groups and epoxy groups per molecule: 87.

(SZ-3) (3-glycidyloxypropyl)triethoxysilane (manufactured by SIGMA-ALDRICH Corporation)
  Mass average molecular weight: 278
  Number of epoxy groups per molecule: 1
  Value obtained by dividing the mass average molecular weight by the total number of carboxyl groups, amino groups, hydroxyl groups and epoxy groups per molecule: 278.

Components of Matrix Resin (B)

(PPS-1) polyphenylene sulfide of phenyl group end product
  Melting point: 285° C.
  Mass average molecular weight: 45,000
  Tensile elongation: 2.0%
  Amount of volatile components: 0.6%.

(PPS-2) polyphenylene sulfide of acid end product
  Melting point: 285° C.
  Mass average molecular weight: 50,000
  Tensile elongation: 2.5%
  Amount of volatile components: 0.7%.

(PPS-3) polyphenylene sulfide of acid end product
  Melting point: 285° C.
  Mass average molecular weight: 55,000
  Tensile elongation: 3.3%
  Amount of volatile components: 0.7%.

(PPS-4) polyphenylene sulfide of acid end product
  Melting point: 285° C.
  Mass average molecular weight: 60,000
  Tensile elongation: 4.5%
  Amount of volatile components: 0.7%.

(PPS-5) polyphenylene sulfide of acid end product
  Melting point: 285° C.
  Mass average molecular weight: 90,000
  Tensile elongation: 11%
  Amount of volatile components: 0.8%.

(PPS-6) polyphenylene sulfide of acid end product
  Melting point: 285° C.
  Mass average molecular weight: 30,000
  Tensile elongation: 0.8%
  Amount of volatile components: 0.5%.

(PPS-7) polyphenylene sulfide of acid end product
  Melting point: 285° C.
  Mass average molecular weight: 40,000
  Tensile elongation: 1.3%
  Amount of volatile components: 0.5%.

(Epoxy-1) glycerol triglycidyl ether (manufactured by Wako Pure Chemical Industries, Ltd.)
  Mass average molecular weight: 260
  Number of epoxy groups per molecule: 3
  Value obtained by dividing the mass average molecular weight by the total number of carboxyl groups, amino groups, hydroxyl groups and epoxy groups per molecule: 87.

(CDI-1) aliphatic polycarbodiimide ("CARBODILITE (registered trademark)" HMV-8CA (manufactured by Nisshinbo Chemical Inc.))
  Carbodiimide group equivalent: 278
  Mass average molecular weight: 3,000.

Reference Example 1

A reinforcing fiber bundle including reinforcing fibers (A) was continuously taken up, immersed in an aqueous surface treatment agent mother liquor containing 2% by mass of a surface treatment agent, and then heated and dried at 230° C. to obtain reinforcing fibers (A) with a surface treatment agent deposited thereon. The reinforcing fibers (A) were defined as CF-1, and the reinforcing fibers (A) with a surface treatment agent deposited thereon, obtained using SZ-1 as the surface treatment agent, were defined as CF-3. In CF-3, the deposition amount of SZ-1 after drying was 1 part by mass based on 100 parts by mass of CF-1.

Reference Example 2

Except that the surface treatment agent was changed from SZ-1 to SZ-2, the same procedure as in Reference Example 1 was carried out to obtain reinforcing fibers (A) with a surface treatment agent deposited thereon. The obtained reinforcing fibers (A) with a surface treatment agent deposited thereon were defined as CF-4. In CF-4, the deposition amount of SZ-2 after drying was 1 part by mass based on 100 parts by mass of CF-1.

Reference Example 3

Except that the surface treatment agent was changed from SZ-1 to SZ-3, the same procedure as in Reference Example 1 was carried out to obtain reinforcing fibers (A) with a surface treatment agent deposited thereon. The obtained reinforcing fibers (A) with a surface treatment agent deposited thereon were defined as CF-5. In CF-5, the deposition amount of SZ-3 after drying was 1 part by mass based on 100 parts by mass of CF-1.

Reference Example 4

CDI-1 was immersed in hot water at 80° C. for 5 days to obtain a compound in which carbodiimide groups were transformed to urea groups, and this compound was defined as Urea-1. Transformation of carbodiimide groups to urea groups was confirmed by disappearance of the absorption peak (2119 cm$^{-1}$) of the carbodiimide group in IR spectrum measurement.

Example 1

A molding material was prepared according to the following procedure using CF-1 as the reinforcing fibers (A) and PPS-2 as the matrix resin (B), and the molding material was then injection-molded to obtain a molded article.

CF-1 was cut to a length of 6 mm to prepare chopped strands. In a twin-screw extruder (TEX-30α from JSW, Inc., (screw length)/(screw diameter)=31.5), PPS-2 was main-fed, and the chopped strands were side-fed to melt and knead the components. The melting and kneading was performed at a cylinder temperature of 290° C., a screw rotation number of 150 rpm and a discharge rate of 10 kg/hour. The discharged product was taken out and simultaneously cooled by a water cooling bath to form a gut, and the gut was cut to a length of 5 mm to form a pellet. The blending amount was adjusted so that the content of CF-1 was 20% by mass, and the content of PPS-2 was 80% by mass.

The pellet was injection-molded to prepare a molded article using an injection molding machine (J150EII-P manufactured by JSW, Inc.). The injection molding was performed at a cylinder temperature of 320° C. and a die temperature of 150° C.

Test pieces were provided from the obtained molded article, annealed at 150° C. for 2 hours, then air-cooled, and subjected to a test. Evaluation results were described in Table 1.

PPS-2 was injection-molded to prepare test pieces for tension evaluation with an injection molding machine (J150EII-P manufactured by JSW, Inc.). The injection molding was performed at a cylinder temperature of 320° C. and a die temperature of 150° C. The obtained test pieces were annealed at 150° C. for 2 hours, then air-cooled, and subjected to a tension test. The tensile elongation of the matrix resin (B) thus obtained was described in Table 1.

Example 2

Except that CF-1 as the reinforcing fibers (A) was blended in an amount of 30% by mass, and PPS-2 as the matrix resin (B) was blended in an amount of 70% by mass, the same procedure as in Example 1 was carried out to prepare test pieces, and the test pieces were subjected to a test. Evaluation results were described in Table 1.

Example 3

Except that CF-1 as the reinforcing fibers (A) was blended in an amount of 40% by mass, and PPS-2 as the matrix resin (B) was blended in an amount of 60% by mass, the same procedure as in Example 1 was carried out to prepare test pieces, and the test pieces were subjected to a test. Evaluation results were described in Table 1.

Example 4

Except that CF-1 as the reinforcing fibers (A) was blended in an amount of 30% by mass, and in place of PPS-2, PPS-3 was blended as the matrix resin (B) in an amount of 70% by mass, the same procedure as in Example 1 was carried out to prepare test pieces, and the test pieces were subjected to a test. Evaluation results were described in Table 1.

Example 5

Except that CF-1 as the reinforcing fibers (A) was blended in an amount of 30% by mass, and in place of PPS-2, PPS-4 was blended as the matrix resin (B) in an amount of 70% by mass, the same procedure as in Example 1 was carried out to prepare test pieces, and the test pieces were subjected to a test. Evaluation results were described in Table 1.

Example 6

A molding material was prepared according to the following procedure using CF-1 as the reinforcing fibers (A) and PPS-3 and Epoxy-1 as the matrix resin (B), and the molding material was then injection-molded to obtain a molded article.

CF-1 was cut to a length of 6 mm to prepare chopped strands. In a twin-screw extruder (TEX-30α from JSW, Inc., (screw length)/(screw diameter)=31.5), a mixture including PPS-3 and Epoxy-1 with 5% by mass of Epoxy-1 dry-blended with 95% by mass of PPS-3 was main-fed as a raw material of the matrix resin (B), and the chopped strands side-fed to melt and knead the components. The melting and kneading was performed at a cylinder temperature of 290° C., a screw rotation number of 150 rpm and a discharge rate of 10 kg/hour. The discharged product was taken out and simultaneously cooled by a water cooling bath to form a gut, and the gut was cut to a length of 5 mm to form a pellet. The blending amount was adjusted so that the content of CF-1 was 30% by mass, and the content of the matrix resin (B) including PPS-3 and Epoxy-1 was 70% by mass.

The pellet was injection-molded to prepare a molded article with an injection molding machine (J150EII-O manufactured by JSW, Inc.). The injection molding was performed at a cylinder temperature of 320° C. and a die temperature of 150° C.

Test pieces were provided from the obtained molded article, annealed at 150° C. for 2 hours, then air-cooled, and subjected to a test. Evaluation results were described in Table 1.

Further, only the raw material of the matrix resin (B) was main-fed to a twin-screw extruder (TEX-30α from JSW, Inc., (screw length)/(screw diameter)=31.5) to be melted and kneaded. The melting and kneading was performed at a cylinder temperature of 290° C., a screw rotation number of 150 rpm and a discharge rate of 10 kg/hour. The discharged product was taken out and simultaneously cooled by a water cooling bath to form a gut, and the gut was cut to a length of 5 mm to obtain a resin pellet including the matrix rein (B).

The resin pellet was injection-molded to prepare test pieces for tension evaluation with an injection molding machine (J150EII-P manufactured by JSW, Inc.). The injection molding was performed at a cylinder temperature of 320° C. and a die temperature of 150° C. The obtained test pieces were annealed at 150° C. for 2 hours, then air-cooled, and subjected to a tension test. The tensile elongation of the matrix resin (B) thus obtained was described in Table 1.

Example 7

Except that the component dry-blended with PPS-3 as the matrix resin (B) was changed from Epoxy-1 to CDI-1, the same procedure as in Example 6 was carried out to prepare test pieces, and the test pieces were subjected to a test. Evaluation results were described in Table 1.

Example 8

Except that the component dry-blended with PPS-3 as the matrix resin (B) was changed from Epoxy-1 to CDI-1, and the blending amount thereof was adjusted so that the content of CDI-1 was 0.5% by mass while the content of PPS-3 was 99.5% by mass, the same procedure as in Example 6 was carried out to prepare test pieces, and the test pieces were subjected to a test. Evaluation results were described in Table 1.

Example 9

Except that as the reinforcing fibers (A), GF-1 was used in place of CF-1, the same procedure as in Example 8 was carried out to prepare test pieces, and the test pieces were subjected to a test. Evaluation results were described in Table 1.

Example 10

Except that the component dry-blended with PPS-3 as the matrix resin (B) was changed from Epoxy-1 to Urea-1, and the blending amount thereof was adjusted so that the content of Urea-1 was 0.5% by mass while the content of PPS-3 was 99.5% by mass, the same procedure as in Example 6 was carried out to prepare test pieces, and the test pieces were subjected to a test. Evaluation results were described in Table 1.

Example 11

Except that in injection molding, molding was performed with the back pressure reduced to 50% of that in Example 1, the same procedure as in Example 1 was carried out to prepare test pieces, and the test pieces were subjected to a test. Evaluation results were described in Table 1.

TABLE 1

| | | Example 1 | Example 2 | Example 3 | Example 4 | Example 5 | Example 6 | Example 7 | Example 8 | Example 9 | Example 10 | Example 11 |
|---|---|---|---|---|---|---|---|---|---|---|---|---|
| (Material) | | | | | | | | | | | | |
| Reinforcing fibers (A) | Type | CF-1 | CF-1 | CF-1 | CF-1 | CF-1 | CF-1 | CF-1 | CF-1 | GF-1 | CF-1 | CF-1 |
| | % by mass | 20 | 30 | 40 | 30 | 30 | 30 | 30 | 30 | 30 | 30 | 20 |
| | Strand strength GPa | 4.9 | 4.9 | 4.9 | 4.9 | 4.9 | 4.9 | 4.9 | 4.9 | 3.4 | 4.9 | 4.9 |
| Matrix resin (B) | % by mass | 80 | 70 | 60 | 70 | 70 | 70 | 70 | 70 | 70 | 70 | 80 |
| (Characteristics of matrix resin (B)) | | | | | | | | | | | | |
| Polyarylene sulfide | Type | PPS-2 | PPS-2 | PPS-2 | PPS-3 | PPS-4 | PPS-3 | PPS-3 | PPS-3 | PPS-3 | PPS-3 | PPS-2 |
| | % by mass | 100 | 100 | 100 | 100 | 100 | 95 | 95 | 99.5 | 99.5 | 99.5 | 100 |
| Other compounds | Type | 0 | 0 | 0 | 0 | 0 | Epoxy-1 | CDI-1 | CDI-1 | CDI-1 | Urea-1 | 0 |
| (Blending amount to polyarylene sulfide) | % by mass | | | | | | 5 | 5 | 0.5 | 0.5 | 0.5 | |
| Tensile elongation of matrix resin (B) | % | 2.5 | 2.5 | 2.5 | 3.3 | 4.5 | 3 | 3 | 3.3 | 3.3 | 3.3 | 2.5 |
| (Molded article) | | | | | | | | | | | | |
| Number average fiber length | mm | 0.8 | 0.7 | 0.5 | 0.4 | 0.6 | 0.5 | 0.6 | 0.6 | 0.4 | 0.6 | 0.9 |
| Tensile strength in main orientation direction | MPa | 250 | 255 | 260 | 255 | 250 | 280 | 280 | 300 | 240 | 280 | 240 |
| Tensile strength in direction orthogonal to main orientation direction | MPa | 150 | 160 | 164 | 180 | 180 | 200 | 200 | 240 | 155 | 210 | 140 |
| Tensile elongation in main orientation direction | % | 1.8 | 1.8 | 1.2 | 1.2 | 1.2 | 1.2 | 1.2 | 1.2 | 1.8 | 1.1 | 1.6 |
| Ratio of the number of fibers dispersed in the form of monofilaments | % | 99 | 95 | 93 | 95 | 99 | 95 | 95 | 95 | 95 | 95 | 91 |
| IFSS | MPa | 21 | 21 | 21 | 23 | 25 | 30 | 32 | 32 | 22 | 27 | 21 |
| Fiber length after tension breakage | mm | 0.20 | 0.20 | 0.20 | 0.19 | 0.18 | 0.18 | 0.16 | 0.16 | 0.16 | 0.16 | 0.20 |

TABLE 1-continued

|  | Example 1 | Example 2 | Example 3 | Example 4 | Example 5 | Example 6 | Example 7 | Example 8 | Example 9 | Example 10 | Example 11 |
|---|---|---|---|---|---|---|---|---|---|---|---|
| Deposition of matrix resin (B) on surface of reinforcing fiber (A) at breakage surface | — | fair | fair | fair | fair | fair | good | good | good | fair | fair | fair |

Comparative Example 1

Except that as the reinforcing fibers (A), CF-2 was used in place of CF-1, the same procedure as in Example 1 was carried out to prepare test pieces, and the test pieces were subjected to a test. Evaluation results were described in Table 2.

Comparative Example 2

Except that in place of CF-1, CF-2 was blended as the reinforcing fibers (A) in an amount of 30% by mass, and the blending amount of PPS-2 as the matrix resin (B) was changed to 70% by mass, the same procedure as in Example 1 was carried out to prepare test pieces, and the test pieces were subjected to a test. Evaluation results were described in Table 2.

Comparative Example 3

Except that the blending amount of CF-1 as the reinforcing fibers (A) was changed from 20% by mass to 30% by mass, the matrix resin (B) was changed from PPS-2 to PPS-1, and the blending amount thereof was changed from 80% by mass to 70% by mass, the same procedure as in Example 1 was carried out to prepare test pieces, and the test pieces were subjected to a test. Evaluation results were described in Table 2.

Comparative Example 4

Except that the blending amount of CF-1 used as the reinforcing fibers (A) was changed from 20% by mass to 30% by mass, the matrix resin (B) was changed from PPS-2 to PPS-5, and the blending amount thereof was changed from 80% by mass to 70% by mass, the same procedure as in Example 1 was carried out to prepare test pieces, and the test pieces were subjected to a test. Evaluation results were described in Table 2.

Comparative Example 5

Except that a change was made so that the blending amount of CF-1 used as the reinforcing fibers (A) was 40% by mass while the blending amount of the matrix resin (B) was 60% by mass, the matrix resin (B) was changed from PPS-2 to a mixture of PPS-3 and Epoxy-1, and a change was made so that the blending amount of Epoxy-1 was 5% by mass while the blending amount of PPS-3 was 95% by mass, the same procedure as in Example 1 was carried out to prepare test pieces, and the test pieces were subjected to a test. Evaluation results were described in Table 2.

Comparative Example 6

Except that a change was made so that the blending amount of CF-1 used as the reinforcing fibers (A) was 40% by mass while the blending amount of the matrix resin (B) was 60% by mass, the matrix resin (B) was changed to a mixture of PPS-3 and CDI-1, and a change was made so that the blending amount of CDI-1 was 5% by mass while the blending amount of PPS-3 was 95% by mass, the same procedure as in Example 6 was carried out to prepare test pieces, and the test pieces were subjected to a test. Evaluation results were described in Table 2.

TABLE 2

|  |  | Comparative Example 1 | Comparative Example 2 | Comparative Example 3 | Comparative Example 4 | Comparative Example 5 | Comparative Example 6 |
|---|---|---|---|---|---|---|---|
| (Material) | | | | | | | |
| Reinforcing fibers (A) | Type | CF-2 | CF-2 | CF-1 | CF-1 | CF-1 | CF-1 |
|  | % by mass | 20 | 30 | 30 | 30 | 40 | 40 |
|  | Strand strength GPa | 1.0 | 1.0 | 4.9 | 4.9 | 4.9 | 4.9 |
| Matrix resin (B) | % by mass | 80 | 70 | 70 | 70 | 60 | 60 |
| (Characteristics of matrix resin (B)) | | | | | | | |
| Polyarylene sulfide | Type | PPS-2 | PPS-2 | PPS-1 | PPS-5 | PPS-3 | PPS-3 |
|  | % by mass | 100 | 100 | 100 | 100 | 95 | 95 |
| Other compounds | Type | 0 | 0 | 0 | 0 | Epoxy-1 | CDI-1 |
| (Blending amount to polyarylene sulfide) | % by mass |  |  |  |  | 5 | 5 |
| Tensile elongation of matrix resin (B) | % | 2.5 | 2.5 | 2.0 | 11 | 3 | 3 |
| (Molded article) | | | | | | | |
| Number average fiber length | mm | 0.4 | 0.4 | 0.4 | 0.2 | 0.2 | 0.2 |
| Tensile strength in main orientation direction | MPa | 125 | 130 | 100 | 120 | 200 | 230 |
| Tensile strength in direction orthogonal to main orientation direction | MPa | 90 | 95 | 75 | 100 | 140 | 140 |
| Tensile elongation in main orientation direction | % | 1.7 | 1.7 | 1.2 | 1.8 | 1.8 | 1.2 |
| Ratio of the number of fibers dispersed in the form of monofilaments | % | 91 | 91 | 80 | 70 | 89 | 80 |

TABLE 2-continued

|  |  | Comparative Example 1 | Comparative Example 2 | Comparative Example 3 | Comparative Example 4 | Comparative Example 5 | Comparative Example 6 |
|---|---|---|---|---|---|---|---|
| IFSS | MPa | 12 | 12 | 15 | 17 | 30 | 32 |
| Fiber length after tension breakage | mm | 0.05 | 0.05 | 0.20 | 0.19 | 0.09 | 0.12 |
| Deposition of matrix resin (B) on surface of reinforcing fiber (A) at breakage surface | — | bad | bad | bad | bad | good | good |

Comparison Between Examples 1 to 11 and Comparative Examples 1 to 6

In Examples 1 to 11 where the strand strength of the reinforcing fibers (A) was secured, the elongation of the matrix rein (B) was selected, the IFSS between the reinforcing fibers (A) and the matrix resin (B) was sufficient, and the number average fiber length of the fibers in the molded article fell within a specific range, the molded article exhibited a high tensile strength of 240 MPa or more in the main orientation direction. In Examples 6 to 10 where further a compound having a specific functional group, or a compound having a specific structure was mixed in the matrix resin (B), the molded article was superior in tensile strength as compared to Examples 1 to 5.

In Comparative Examples 1 and 2, the reinforcing fibers had an insufficient strand strength, and the IFSS between the reinforcing fibers (A) and the matrix resin (B) was low so that the resulting molded article was poor in tensile strength.

In Comparative Example 3, the IFSS between the reinforcing fibers (A) and the matrix resin (B) was low so that the resulting molded article was poor in tensile strength.

In Comparative Example 4, the matrix resin (B) had a large mass average molecular weight, and the reinforcing fibers (A) in the molded article had a small number average fiber length. Further, the IFSS between the reinforcing fibers (A) and the matrix resin (B) was low so that the resulting molded article was poor in tensile strength.

In Comparative Examples 5 and 6, the reinforcing fibers (A) in the molded article had a number average fiber length of less than 0.4 mm, and therefore although the IFSS between the reinforcing fibers (A) and the matrix resin (B) was 20 or more, the resulting molded article was poor in tensile strength.

Example 12

A molding material was prepared according to the following procedure using CF-1 as the reinforcing fibers (A) and PPS-6 and CDI-1 as the matrix resin (B), and the molding material was then injection-molded to obtain a molded article.

PPS-6 and CDI-1 were dry-blended with each other such that the content of CDI-1 was 5% by mass while the content of PPS-6 was 95% by mass, and the mixture was main-fed to a twin-screw extruder (TEX-30α from JSW, Inc., (screw length)/(screw diameter)=31.5) to be melted and kneaded. The melting and kneading was performed at a cylinder temperature of 290° C., a screw rotation number of 150 rpm and a discharge rate of 10 kg/hour. The discharged product was taken out and simultaneously cooled by a water cooling bath to form a gut, and the gut was cut to a length of 5 mm to obtain a resin pellet including the matrix rein (B).

Using an injection molding machine (J150EII-P manufactured by JSW, Inc.), the resin pellet was injection-molded to prepare test pieces for tension evaluation. The injection molding was performed at a cylinder temperature of 320° C. and a die temperature of 150° C. The obtained test pieces were annealed at 150° C. for 2 hours, then air-cooled, and subjected to a tension test. The tensile elongation of the matrix resin (B) thus obtained was described in Table 3.

The resin pellet was melted and kneaded in a single-screw extruder at 320° C. to form the molten matrix resin (B), and the molten matrix resin (B) was supplied to an impregnation tank mounted at the head of the extruder. Further, CF-1 was continuously taken up as a reinforcing fiber bundle including the reinforcing fibers (A), and caused to pass through the inside of the impregnation tank, thereby obtaining an impregnated strand with a reinforcing fiber bundle impregnated with a fixed amount of the matrix resin (B) per unit length thereof. The impregnated strand was cooled by a water cooling bath to form a gut, and the gut was cut to a length of 7 mm to form a reinforcing fiber-containing pellet. The blending amount was adjusted so that the content of the reinforcing fibers (A) was 20% by mass, and the content of the matrix resin (B) was 80% by mass. The number average fiber length of the molding material was measured from the thus-obtained reinforcing fiber-containing pellet. The number average fiber length of the molding material was described in Table 3.

Using an injection molding machine (J150EII-P manufactured by JSW, Inc.), the reinforcing fiber-containing pellet was injection-molded to prepare a molded article. The injection molding was performed at a cylinder temperature of 320° C. and a die temperature of 150° C.

Test pieces were provided from the obtained molded article, annealed at 150° C. for 2 hours, then air-cooled, and subjected to a test. Evaluation results were described in Table 3.

Comparative Example 7

Except that the compound used in dry-blending as the matrix resin (B) was changed from CDI-1 to Epoxy-1, the same procedure as in Example 12 was carried out to prepare a molding material, and test pieces were provided from a molded article produced using the molding material, and were subjected to various kinds of tests. Evaluation results were described in Table 3.

Comparative Example 8

Except that the compound used in dry-blending as the matrix resin (B) was omitted, and only PPS-6 was used as the matrix resin (B), the same procedure as in Example 12 was carried out to prepare a molding material, and test pieces were provided from a molded article produced using the molding material, and were subjected to various kinds of tests. Evaluation results were described in Table 3.

Example 13

Except that the PAS used in dry-blending as the matrix resin (B) was changed from PPS-6 to PPS-7, the same procedure as in Example 12 was carried out to prepare a molding material, and test pieces were provided from a molded article produced using the molding material, and were subjected to various kinds of tests. Evaluation results were described in Table 3.

Comparative Example 9

Except that the compound used in dry-blending as the matrix resin (B) was changed from CDI-1 to Epoxy-1, the same procedure as in Example 13 was carried out to prepare a molding material, and test pieces were provided from a molded article produced using the molding material, and were subjected to various kinds of tests. Evaluation results were described in Table 3.

Comparative Example 10

Except that the compound used in dry-blending as the matrix resin (B) was omitted, and only PPS-7 was used as the matrix resin (B), the same procedure as in Example 13 was carried out to prepare a molding material, and test pieces were provided from a molded article produced using the molding material, and were subjected to various kinds of tests. Evaluation results were described in Table 3.

Example 14

Except that the PAS used in dry-blending as the matrix resin (B) was changed from PPS-6 to PPS-4, the same procedure as in Example 12 was carried out to prepare a molding material, and test pieces were provided from a molded article produced using the molding material, and were subjected to various kinds of tests. Evaluation results were described in Table 3.

Example 15

Except that the compound used in dry-blending as the matrix resin (B) was changed from CDI-1 to Epoxy-1, the same procedure as in Example 14 was carried out to prepare a molding material, and test pieces were provided from a molded article produced using the molding material, and were subjected to various kinds of tests. Evaluation results were described in Table 3.

Comparative Example 11

Except that the compound used in dry-blending as the matrix resin (B) was omitted, and only PPS-4 was used as the matrix resin (B), the same procedure as in Example 14 was carried out to prepare a molding material, and test pieces were provided from a molded article produced using the molding material, and were subjected to various kinds of tests. Evaluation results were described in Table 3.

Comparative Example 12

Except that the PAS used in dry-blending as the matrix resin (B) was changed from PPS-6 to PPS-5, the same procedure as in Example 12 was carried out to prepare a molding material, and test pieces were provided from a molded article produced using the molding material, and were subjected to various kinds of tests. Evaluation results were described in Table 3.

Comparative Example 13

Except that the compound used in dry-blending as the matrix resin (B) was changed from CDI-1 to Epoxy-1, the same procedure as in Comparative Example 12 was carried out to prepare a molding material, and test pieces were provided from a molded article produced using the molding material, and were subjected to various kinds of tests. Evaluation results were described in Table 3.

Comparative Example 14

Except that the compound used in dry-blending as the matrix resin (B) was omitted, and only PPS-5 was used as the matrix resin (B), the same procedure as in Comparative Example 12 was carried out to prepare a molding material, and test pieces were provided from a molded article produced using the molding material, and were subjected to various kinds of tests. Evaluation results were described in Table 3.

TABLE 3

| | | Example 12 | Comparative Example 7 | Comparative Example 8 | Example 13 | Comparative Example 9 | Comparative Example 10 |
|---|---|---|---|---|---|---|---|
| (Material) | | | | | | | |
| Reinforcing fibers (A) | Type | CF-1 | CF-1 | CF-1 | CF-1 | CF-1 | CF-1 |
| | % by mass | 20 | 20 | 20 | 20 | 20 | 20 |
| | Strand strength GPa | 4.9 | 4.9 | 4.9 | 4.9 | 4.9 | 4.9 |
| Matrix resin (B) | % by mass | 80 | 80 | 80 | 80 | 80 | 80 |
| (Characteristics of matrix resin (B)) | | | | | | | |
| Polyarylene sulfide | Type | PPS-6 | PPS-6 | PPS-6 | PPS-7 | PPS-7 | PPS-7 |
| | % by mass | 95 | 95 | 100 | 95 | 95 | 100 |
| Other compounds | Type | CDI-1 | Epoxy-1 | 0 | CDI-1 | Epoxy-1 | 0 |
| (Blending amount to polyarylene sulfide) | % by mass | 5 | 5 | | 5 | 5 | |
| Tensile elongation of matrix resin (B) | % | 1.6 | 0.6 | 0.8 | 2.6 | 1 | 1.3 |
| (Molding material) | | | | | | | |
| Number average fiber length of reinforcing fibers (A) contained in molding material | mm | 7 | 7 | 7 | 7 | 7 | 7 |

TABLE 3-continued (Molded article)

|  |  | | | | | | |
|---|---|---|---|---|---|---|---|
| Number average fiber length of reinforcing fibers (A) contained in molded article | mm | 1 | 1 | 1 | 0.7 | 0.9 | 0.9 |
| Tensile strength in main orientation direction | MPa | 315 | 200 | 190 | 310 | 210 | 200 |
| Tensile strength in direction orthogonal to main orientation direction | MPa | 200 | 140 | 140 | 190 | 145 | 140 |
| Tensile elongation in main orientation direction | % | 1.4 | 0.9 | 0.9 | 1.3 | 1 | 0.9 |
| Ratio of the number of fibers dispersed in the form of monofilaments | % | 94 | 99 | 99 | 92 | 95 | 95 |
| IFSS | MPa | 32 | 30 | 20 | 32 | 30 | 20 |
| Fiber length after tension breakage | mm | 0.2 | 0.25 | 0.3 | 0.2 | 0.3 | 0.35 |
| Deposition of matrix resin (B) on surface of reinforcing fiber (A) at breakage surface | — | excellent | excellent | fair | excellent | excellent | fair |

|  | Example 14 | Example 15 | Comparative Example 11 | Comparative Example 12 | Comparative Example 13 | Comparative Example 14 |
|---|---|---|---|---|---|---|
| (Material) | | | | | | |
| Reinforcing fibers (A) | CF-1<br>20<br>4.9 | CF-1<br>20<br>4.9 | CF-1<br>20<br>4.9 | CF-1<br>20<br>4.9 | CF-1<br>20<br>4.9 | CF-1<br>20<br>4.9 |
| Matrix resin (B) | 80 | 80 | 80 | 80 | 80 | 80 |
| (Characteristics of matrix resin (B)) | | | | | | |
| Polyarylene sulfide | PPS-4<br>95 | PPS-4<br>95 | PPS-4<br>100 | PPS-5<br>95 | PPS-5<br>95 | PPS-5<br>100 |
| Other compounds | CDI-1 | Epoxy-1 | 0 | CDI-1 | Epoxy-1 | 0 |
| (Blending amount to polyarylene sulfide) | 5 | 5 | | 5 | 5 | |
| Tensile elongation of matrix resin (B) | 3.2 | 3.1 | 4.5 | 3.3 | 3.3 | 11 |
| (Molding material) | | | | | | |
| Number average fiber length of reinforcing fibers (A) contained in molding material | 7 | 7 | 7 | 7 | 7 | 7 |
| (Molded article) | | | | | | |
| Number average fiber length of reinforcing fibers (A) contained in molded article | 0.5 | 0.5 | 0.3 | 0.2 | 0.2 | 0.1 |
| Tensile strength in main orientation direction | 250 | 240 | 220 | 210 | 200 | 170 |
| Tensile strength in direction orthogonal to main orientation direction | 175 | 170 | 145 | 140 | 135 | 115 |
| Tensile elongation in main orientation direction | 1.1 | 1.1 | 1 | 1 | 0.9 | 0.8 |
| Ratio of the number of fibers dispersed in the form of monofilaments | 91 | 91 | 88 | 65 | 65 | 60 |
| IFSS | 32 | 30 | 20 | 32 | 30 | 20 |
| Fiber length after tension breakage | 0.2 | 0.2 | 0.14 | 0.1 | 0.1 | 0.05 |
| Deposition of matrix resin (B) on surface of reinforcing fiber (A) at breakage surface | good | good | bad | good | good | bad |

The results in Examples and Comparative Examples described in Table 3.

A comparison between the molded article described in Example 12 and the molded articles described in Comparative Examples 7 and 8 shows that when CDI-1 is added, both an increase in tensile elongation of PPS-6 and an improvement in IFSS can be achieved to obtain a molded article excellent in tensile strength.

A comparison between the molded article described in Example 13 and the molded articles described in Comparative Examples 9 and 10 shows that when CDI-1 is added, both an increase in tensile elongation of PPS-7 and an improvement in IFSS can be achieved to obtain a molded article excellent in tensile strength.

A comparison between the molded articles described in Examples 14 and 15 and the molded article described in Comparative Example 11 shows that when CDI-1 is added, the tensile elongation of PPS-4 is decreased, but the IFSS is improved. Further, it is apparent that when the number average fiber length of the reinforcing fibers (A) is 0.4 mm or more, a molded article excellent in tensile strength is obtained.

A comparison among the molded articles described in Comparative Examples 12 to 14 shows that when CDI-1 is added, the tensile elongation of PPS-5 is decreased, but the IFSS is improved. Further, it is apparent that when the number average fiber length of the reinforcing fibers (A) is less than 0.4 mm, a molded article excellent in tensile strength cannot be obtained.

A comparison between the molded articles described in Examples 12 to 14 and the molded article described in Comparative Example 12 shows that when the PAS used in the matrix resin (B) has a smaller mass average molecular weight, the number average fiber length of the fibers in the resulting molded article increases so that a molded article excellent in tensile strength is obtained.

Example 16

Except that the blending amount of CF-1 used as the reinforcing fibers (A) was changed from 20% by mass to 30% by mass, and the blending amount of the matrix resin (B) was changed from 80% by mass to 70% by mass, the same procedure as in Example 12 was carried out to prepare a molding material, and test pieces were provided from a molded article produced using the molding material, and were subjected to various kinds of tests. Evaluation results were described in Table 4.

Comparative Example 15

Except that the compound used in dry-blending as the matrix resin (B) was omitted, and only PPS-6 was used as the matrix resin (B), the same procedure as in Example 16 was carried out to prepare a molding material, and test pieces were provided from a molded article produced using the molding material, and were subjected to various kinds of tests. Evaluation results were described in Table 4.

Comparative Example 16

Except that the blending amount of CF-1 used as the reinforcing fibers (A) was changed from 20% by mass to 50% by mass, and the blending amount of the matrix resin (B) was changed from 80% by mass to 50% by mass, the same procedure as in Example 12 was carried out to prepare a molding material, and test pieces were provided from a molded article produced using the molding material, and were subjected to various kinds of tests. Evaluation results were described in Table 4.

Comparative Example 17

Except that the compound used in dry-blending as the matrix resin (B) was omitted, and only PPS-6 was used as the matrix resin (B), the same procedure as in Comparative Example 16 was carried out to prepare a molding material, and test pieces were provided from a molded article produced using the molding material, and were subjected to various kinds of tests. Evaluation results were described in Table 4.

Example 17

Except that the reinforcing fibers (A) were changed from CF-1 to CF-3, the same procedure as in Example 12 was carried out to prepare a molding material, and test pieces were provided from a molded article produced using the molding material, and were subjected to various kinds of tests. Evaluation results were described in Table 4.

Example 18

Except that the reinforcing fibers (A) were changed from CF-1 to CF-4, the same procedure as in Example 12 was carried out to prepare a molding material, and test pieces were provided from a molded article produced using the molding material, and were subjected to various kinds of tests. Evaluation results were described in Table 4.

Example 19

Except that the reinforcing fibers (A) were changed from CF-1 to CF-5, the same procedure as in Example 12 was carried out to prepare a molding material, and test pieces were provided from a molded article produced using the molding material, and were subjected to various kinds of tests. Evaluation results were described in Table 4.

Example 20

Except that the reinforcing fibers (A) were changed from CF-1 to GF-1, the same procedure as in Example 16 was carried out to prepare a molding material, and test pieces were provided from a molded article produced using the molding material, and were subjected to various kinds of tests. Evaluation results were described in Table 4.

TABLE 4

|  |  | Example 16 | Comparative Example 15 | Comparative Example 16 | Comparative Example 17 | Example 17 | Example 18 | Example 19 | Example 20 |
| --- | --- | --- | --- | --- | --- | --- | --- | --- | --- |
| (Material) | | | | | | | | | |
| Reinforcing fibers (A) | Type | CF-1 | CF-1 | CF-1 | CF-1 | CF-3 | CF-4 | CF-5 | GF-1 |
|  | % by mass | 30 | 30 | 50 | 50 | 20 | 20 | 20 | 30 |
|  | Strand strength GPa | 4.9 | 4.9 | 4.9 | 4.9 | 4.9 | 4.9 | 4.9 | 3.4 |
| Matrix resin (B) | % by mass | 70 | 70 | 50 | 50 | 80 | 80 | 80 | 70 |
| (Characteristics of matrix resin (B)) | | | | | | | | | |
| Polyarylene sulfide | Type | PPS-6 | PPS-6 | PPS-6 | PPS-6 | PPS-6 | PPS-6 | PPS-6 | PPS-6 |
|  | % by mass | 95 | 100 | 95 | 100 | 95 | 95 | 95 | 95 |
| Other compounds | Type | CDI-1 | 0 | CDI-1 | 0 | CDI-1 | CDI-1 | CDI-1 | CDI-1 |
| (Blending amount to polyarylene sulfide) | % by mass | 5 |  | 5 |  | 5 | 5 | 5 | 5 |
| Tensile elongation of matrix resin (B) | % | 1.6 | 0.8 | 1.6 | 0.8 | 1.6 | 1.6 | 1.6 | 1.6 |

TABLE 4-continued

|  |  | Example 16 | Comparative Example 15 | Comparative Example 16 | Comparative Example 17 | Example 17 | Example 18 | Example 19 | Example 20 |
|---|---|---|---|---|---|---|---|---|---|
| (Molding material) | | | | | | | | | |
| Number average fiber length of reinforcing fibers (A) contained in molding material | mm | 7 | 7 | 7 | 7 | 7 | 7 | 7 | 7 |
| (Molded article) | | | | | | | | | |
| Number average fiber length of reinforcing fibers (A) contained in molded article | mm | 0.8 | 0.7 | 0.2 | 0.2 | 1 | 1 | 1 | 0.6 |
| Tensile strength in main orientation direction | MPa | 285 | 210 | 180 | 150 | 290 | 320 | 270 | 240 |
| Tensile strength in direction orthogonal to main orientation direction | MPa | 205 | 145 | 95 | 80 | 205 | 225 | 195 | 170 |
| Tensile elongation in main orientation direction | % | 1 | 0.7 | 0.6 | 0.5 | 1.3 | 1.4 | 1.2 | 1.1 |
| Ratio of the number of fibers dispersed in the form of monofilaments | % | 92 | 94 | 60 | 65 | 94 | 94 | 94 | 94 |
| IFSS | MPa | 32 | 20 | 32 | 20 | 30 | 34 | 24 | 22 |
| Fiber length after tension breakage | mm | 0.20 | 0.30 | 0.10 | 0.10 | 0.20 | 0.20 | 0.20 | 0.18 |
| Deposition of matrix resin (B) on surface of reinforcing fiber (A) at breakage surface | — | — | excellent | fair | excellent | fair | excellent | excellent | good | good |

The results in Examples and Comparative Examples described in Table 3 and Table 4.

A comparison between the molded articles described in Examples 12 and 16 and the molded articles described in Comparative Examples 7 and 15 to 17 shows that when the blending amount of the reinforcing fibers (A) falls out of the range of 10 to 40% by mass, the reinforcing fibers (A) in the resulting molded article have a small fiber length so that the molded article is poor in strength.

A comparison between the molded article described in Example 12 and the molded articles described in Comparative Examples 17 to 19 shows that when CF-1 surface-treated with SZ-2 is used as the reinforcing fiber (A), the IFSS is improved and, consequently, a molded article excellent in tensile strength is obtained.

A comparison between Example 16 and Example 20 shows that when the strand strength of the reinforcing fibers (A), and the IFSS decrease, the strength of the resulting molded article considerably decreases.

INDUSTRIAL APPLICABILITY

Our molded articles exhibit an excellent tensile strength. The molded articles have an outstandingly high tensile strength and, therefore, can be used in a wide range of applications such as automobile interiors and exteriors, electric and electronic device housings, reinforcing materials in the field of civil engineering and construction, and sporting goods. The molding material can be suitably used to produce such a molded article with high productivity.

The invention claimed is:

1. A molded article comprising:
   10 to 40% by mass of reinforcing fibers (A); and
   60 to 90% by mass of a matrix resin (B) mainly including a polyarylene sulfide, the molded article satisfying conditions (I) to (IV) and having a tensile strength of 240 MPa or more in a main orientation direction of the reinforcing fibers (A) in the molded article:
   (I) strand tensile strength of the reinforcing fibers (A) is 1.5 to 5.5 OPa;
   (II) number average fiber length of the reinforcing fibers (A) in the molded article is 0.4 mm or more and less than 0.6 mm;
   (III) tensile elongation of the matrix resin (B) is 1.5 to 10%; and
   (IV) interfacial shear strength between the reinforcing fibers (A) and the matrix resin (B) is 20 MPa or more.

2. The molded article according to claim 1, wherein the reinforcing fibers (A) are carbon fibers surface-treated with a surface treatment agent which is a compound having, in one molecule, three or more functional groups of at least one type selected from the group consisting of a carboxyl group, an amino group, a hydroxyl group and an epoxy group.

3. The molded article according to claim 2, wherein the surface treatment agent is contained in an amount of 0.01 to 5 parts by mass based on 100 parts by mass of the reinforcing fibers (A).

4. The molded article according to claim 2, wherein thickness of a film formed on the surfaces of the reinforcing fibers (A) by the surface treatment agent is 10 to 150 nm.

5. The molded article according to claim 1, wherein a ratio of the number of fibers dispersed in the form of monofilaments to the number of reinforcing fiber (A) (fiber dispersion ratio P) in the molded article is 90 to 100%.

6. The molded article according to claim 1, wherein mass average molecular weight of the polyarylene sulfide as a main component of the matrix resin (B) is 10,000 to 40,000.

7. The molded article according to claim 1, wherein the content of volatile components, when the polyarylene sulfide is heated and melted at 3200 for 120 minutes, is 0.8% by mass or less.

8. The molded article according to claim 1, wherein the (III) tensile elongation of the matrix resin (B) is measured from a Type-I dumbbell test piece using a strain gauge in conformity with ASTM D63.

9. A molded article comprising:
   10 to 40% by mass of reinforcing fibers (A); and
   60 to 90% by mass of a matrix resin (B) mainly including a polyarylene sulfide,
   wherein the reinforcing fibers (A) are carbon fibers surface-treated with a compound having, in one molecule, three or more functional groups of at least one type selected from the group consisting of a carboxyl group, an amino group, a hydroxyl group and an epoxy group;

the molded article satisfying conditions (I) to (IV) and having a tensile strength of 240 MPa or more in a main orientation direction of the reinforcing fibers (A) in the molded article:

(I) strand tensile strength of the reinforcing fibers (A) is 1.5 to 5.5 OPa;

(II) number average fiber length of the reinforcing fibers (A) in the molded article is 0.4 to 10 mm;

(III) tensile elongation of the matrix resin (B) is 1.5 to 10%; and (IV) interfacial shear strength between the reinforcing fibers (A) and the matrix resin (B) is 20 MPa or more.

10. A molded article comprising:

10 to 40% by mass of reinforcing fibers (A); and 60 to 90% by mass of a matrix resin (B) mainly including a polyarylene sulfide, wherein mass average molecular weight of the polyarylene sulfide as a main component of the matrix resin (B) is 10,000 to 40,000;

the molded article satisfying conditions (I) to (IV) and having a tensile strength of 240 MPa or more in a main orientation direction of the reinforcing fibers (A) in the molded article:

(I) strand tensile strength of the reinforcing fibers (A) is 1.5 to 5.5 OPa;

(II) number average fiber length of the reinforcing fibers (A) in the molded article is 0.4 to 10 mm;

(III) tensile elongation of the matrix resin (B) is 1.5 to 10%; and (IV) interfacial shear strength between the reinforcing fibers (A) and the matrix resin (B) is 20 Mpa or more.

* * * * *